United States Patent
Kwok et al.

(10) Patent No.: US 8,959,155 B1
(45) Date of Patent: Feb. 17, 2015

(54) DATA COMPRESSION THROUGH REDUNDANCY REMOVAL IN AN APPLICATION ACCELERATION ENVIRONMENT

(75) Inventors: Henry Kin-Chuen Kwok, Fremont, CA (US); Ashwath Nagaraj, Los Altos Hills, CA (US)

(73) Assignee: Aryaka Networks, Inc., Newark, CA (US)

( * ) Notice: Subject to any disclaimer, the term of this patent is extended or adjusted under 35 U.S.C. 154(b) by 711 days.

(21) Appl. No.: 13/220,988

(22) Filed: Aug. 30, 2011

Related U.S. Application Data

(63) Continuation-in-part of application No. 12/550,409, filed on Aug. 31, 2009, now Pat. No. 8,489,685.

(60) Provisional application No. 61/226,407, filed on Jul. 17, 2009.

(51) Int. Cl.
*G06F 15/16* (2006.01)

(52) U.S. Cl.
USPC .......................................... 709/205

(58) Field of Classification Search
CPC ... G06F 3/0608; G06F 3/0635; G06F 3/0667; G06F 3/067; G06F 21/01
USPC .......................................... 709/205
See application file for complete search history.

(56) References Cited

U.S. PATENT DOCUMENTS

2010/0329256 A1* 12/2010 Akella et al. .................. 370/392

* cited by examiner

*Primary Examiner* — Maceeh Anwari
(74) *Attorney, Agent, or Firm* — Raj Abhyanker, P.C.

(57) ABSTRACT

A method, an apparatus and/or a system of data compression through redundancy removal in an application acceleration environment is disclosed. In one aspect, a method includes generating through a fingerprint module of a redundancy removal engine associated with a first network element a hash identifier of at least one portion of data of a contiguous data block stored in a bidirectional cache memory of the redundancy removal engine associated with a first network element. The size of contiguous data block is larger than the size of the at least one portion of data of the contiguous data block for which the hash identifier is generated. The method further includes compressing a data stream through a transmission compression module of the redundancy removal engine based on the at least one a hash identifier that is indexed.

37 Claims, 15 Drawing Sheets

US 8,959,155 B1

DATA COMPRESSION THROUGH REDUNDANCY REMOVAL IN AN APPLICATION ACCELERATION ENVIRONMENT

CLAIM OF PRIORITY

This is a continuation in part application and claims priority to:
- U.S. Utility application Ser. No. 12/550,409 titled "APPLICATION ACCELERATION AS A SERVICE SYSTEM AND METHOD" filed on Aug. 31, 2009 now U.S. Pat. No. 8,489,685;
- U.S. Provisional Application No. 61/226,407 titled "ENTERPRISE APPLICATION AND SECURE DATA ACCELERATION AS A SERVICE SYSTEM AND METHOD filed on Jul. 17, 2009.

FIELD OF INVENTION

This disclosure relates generally to a field of computer networking and, in one example embodiment, to data compression through redundancy removal in an application accelerated environment.

BACKGROUND

A bandwidth constrained network connection may lead to delay in data transmission and waste substantial amount of time of a user. Data de-duplication may be a method to optimize a bandwidth constrained network connection. Data de-duplication may increase bandwidth efficiency in a network through compressing a data stream transmitted over the network connection. The data stream may be compressed through detecting and replacing redundant data with a signature data that is of smaller data size than the original data.

To get effective data compression, a block size (e.g., the data represented by the fingerprint) may have to be small. However, a small block size may result in a large amount of signature data (e.g., fingerprints). The large amount of signature data may require a storage device of large memory size which may not be cost efficient way of storage. Now, to be storage efficient, the block size may have to be large. However, when the block size is large the compression of the data may be degraded. The degraded compression may result in inefficient usage of the network bandwidth. The tradeoff may lead to inefficient data de-duplication.

SUMMARY

Disclosed are a method, an apparatus and/or a system of data compression through redundancy removal in an application acceleration environment. In one aspect, a method includes receiving a data stream at the transmission control module of the redundancy removal engine associated with the first network element via a first network connection that communicatively couples the first network element with a source of the data stream. The method also includes generating through a fingerprint module of the redundancy removal engine a hash identifier of at least one portion of data of a contiguous data block stored in a bidirectional cache memory based on an identifier constraint. The size of contiguous data block is larger than the size of the at least one portion of data of the contiguous data block for which the hash identifier is generated. Each contiguous data block to have a plurality of hash identifiers associated with the contiguous data block. The method further includes selecting through a transmission control module of the redundancy removal engine at least one hash identifier of the plurality of hash identifiers that is generated through the fingerprint module to index the at least one hash identifier based on a sparsity constraint. The method also includes compressing the data stream through a transmission compression module of the redundancy removal engine based on the at least one hash identifier that is indexed.

The method of compressing the data stream through a transmission compression module of the redundancy removal engine based on the hash identifier that is indexed, further includes replacing through a transmission compression module of the redundancy removal engine the portion of data of the data stream that is redundant with a set of commands to compress the data stream based on the at least one hash identifier that is indexed. The method may include assigning through a mapping module of the redundancy removal engine a pointer identifier to the contiguous data block. The pointer identifier may identify the contiguous data block. The pointer identifier that identifies the contiguous data block may be associated with the plurality of hash identifiers that represent the different portions of data of the contiguous data block represented by the pointer identifier for which the hash identifier is generated. Each of the plurality of hash identifiers may represent each of a different portion of data of the contiguous data block for which the hash identifier is generated. The method also includes storing through a data store module of a redundancy removal engine associated with a first network element a contiguous data block associated with a data stream in a bidirectional cache memory of the first network element. The method of storing through a data store module of a redundancy removal engine associated with the first network element a contiguous data block associated with a data stream in a bidirectional cache memory of the first network element, further includes receiving the data stream through the transmission control module at the data store module of the first network element via a first network connection that communicatively couples the first network element with a source of the data stream. The method also includes identifying the contiguous data block of a threshold size associated with data stream to have a new data. The method also includes storing the contiguous data block having new data nearly simultaneously in at least one of the bidirectional cache memory and a persistent storage device of the data store module. The method includes replacing an existing contiguous data block in the bidirectional cache memory with the contiguous data block having new data based on a first in first out policy if the bidirectional cache memory is full when the contiguous data block having new data is identified. The method further includes storing the existing contiguous data block that is replaced in the persistent storage device.

The method of selecting at least one hash identifier of the plurality of hash identifiers that is generated through the fingerprint module based on a sparsity constraint, further includes applying a most significant bit rule of the sparsity constraint to the plurality of hash identifier generated through the fingerprint module to select at least one hash identifier to index where the at least one hash identifier is selected when an equivalent value of a threshold number of the most significant bits of the hash identifier of the portion of data of the contiguous data block is determined to be equal to a predetermined value. The method also includes reducing the number of hash identifiers that are indexed based on a distance rule of the sparsity constraint where the hash identifier is indexed if the portion of data of the contiguous data block represented through the hash identifier is spaced at least a threshold data size distant from another portion of data of the contiguous data block represented through another hash identifier that is indexed, wherein the number of hash identifiers that are indexed are reduced to decrease the memory space associated with the first network element consumed through indexing the hash identifiers.

The method wherein the at least one hash identifier that is indexed to replace the portion of data in another data stream with the hash identifier when the portion of the data is found in the other data stream, further includes generating a hash identifier of a portion of data associated with the data stream received at the data store module of the first network element through a first network connection that communicatively couples the first network element with a source of the data stream based on the identifier constraint. The method also includes comparing the hash identifier of the portion of the data stream with the indexed hash identifier of the portion of data associated with the contiguous data block stored in the cache to find a match.

The method wherein when the hash identifier of the portion of the data stream matches the indexed hash identifier of the portion of data associated with the contiguous data block stored in the cache the method further includes retrieving through the transmission control module of the redundancy removal engine the contiguous data block stored in the bidirectional cache comprising the portion of data associated with the indexed hash identifier of the portion of data of the data block that matches with the hash identifier of the portion of data associated with the data stream. The method also includes comparing the portion of data of the contiguous data block associated with the indexed hash identifier with the portion of data of the data stream associated with the hash identifier that matches the indexed hash identifier to verify a match between the portion of data of the contiguous data block associated with the indexed hash identifier and the portion of data of the data stream associated with the hash identifier that matches the indexed hash identifier based on the match between the indexed hash identifier that represents the portion of data of the contiguous data block stored in the bidirectional cache and the hash identifier that represents the portion of data of the data stream. The method also includes maximizing the portion of data of the data stream that is matched with the portion of data of the contiguous data block stored in the bidirectional cache through a per byte bidirectional expansion of the portion of data of the data stream associated with the hash identifier that matches the indexed hash identifier of the portion of data of the contiguous data block stored in the bidirectional cache and nearly simultaneous comparison of the expanded portion of data of the data stream with the data of the contiguous data block stored in the bidirectional cache associated with the indexed hash identifier that matches the hash identifier of the portion of data of the data stream to find a maximal matching portion of data of the data stream associated with the data block represented by the matching indexed hash. The expansion limit may be the size of the contiguous data block stored in the bidirectional cache.

The method wherein when the maximal matching portion of data of the data stream is found further includes replacing the maximal matched portion of data of the data stream with a redundancy instruction comprising an additional information and the pointer identifier that identifies the contiguous data block stored in the bidirectional cache that is associated with the maximal matched portion of data of the data stream to compress the data stream that is transmitted from the first network element. The redundancy instruction may enable a reconstruction of the compressed portion of the data stream that is compressed through replacing redundant data with redundancy instructions. The data size of the redundancy instruction along with the additional information and the indexed hash identifier comprised in the redundancy instruction may be smaller than the size of the maximal matched portion of data of the data stream that is replaced with the redundancy instruction.

The method also includes appending a threshold number of priority bits to the indexed hash identifier of the portion of data of the contiguous data block stored in the bidirectional cache to manage the indexed hash identifier. The threshold number of priority bits may indicate a priority level of the indexed hash identifier to which the threshold number of priority bits may be appended. The method further includes evicting the fingerprints with lower priority to effectively reduce the number of indexed hash identifiers of the different portions of data of the contiguous data block stored in the bidirectional cache to manage the index that associates the indexed hash identifier to at least one of the portion of data of the data block and the data block based on which the indexed hash identifier is generated.

The method includes transmitting the compressed data stream through the transmission control module of the redundancy removal engine of the first network element to a second network element communicatively coupled to the first network element. The method also includes receiving through a receiver control module of the redundancy removal engine another compressed data stream through a second network connection associated with the first network element that communicatively couples the first network element to the second network element from which the compressed data is received. The method also includes reconstructing through a decompression module of the redundancy removal engine a compressed portion of the other data stream that is received based on a redundancy instruction that is used replace a maximal matched portion of the other data stream to compress the other data stream. The method also includes replacing through a receiver control module of the redundancy removal engine the compressed portion of the other data stream that is received based on the redundancy instruction with the maximal matched portion of the other data stream via the bidirectional cache of the first network element. The hash identifier of portion of data of the contiguous data block stored in the bidirectional cache that is indexed and/or the hash identifier of the portion of data of the data stream may be generated based on a Rabin Karp hash algorithm. The bidirectional cache to serve the receiver control module, the transmission control module, the decompression module and/or the transmission compression module of the redundancy removal engine associated with the first network element. The hash identifier may be associated with the pointer identifier that represents the contiguous data block stored in the bidirectional cache memory.

In another aspect a network element includes a redundancy removal engine configured to compress a data stream received via a first network connection that communicatively couples the first network element to the source of the data stream based on a hash identifier that is indexed associated with a contiguous data block stored in the bidirectional cache memory of the redundancy removal engine. The network element also includes a fingerprint module of the redundancy removal engine configured to generate a hash identifier of at least one portion of data of the contiguous data block stored in the cache memory based on an identifier constraint. The size of contiguous data block is larger than the size of the at least one portion of data of the contiguous data block for which the hash identifier is generated. Each contiguous data block to have a plurality of hash identifiers that represent a plurality of different portions of data of the contiguous data block for which the hash identifier is generated. The identifier constraint based on which at least one of the hash identifier of portion of data of the contiguous data block stored in the bidirectional cache that is indexed and the hash identifier of the portion of data of the data stream is generated may be a Rabin Karp hash algorithm.

In yet another aspect a network system includes a source of a data stream. The system also includes a first network element comprising a redundancy removal engine that is configured to compress a data stream received through a first network connection that communicatively couples the first network element to the source of the data stream based on an indexed hash identifier associated with a contiguous data block stored in the bidirectional cache memory of the redundancy removal engine. The system further includes a fingerprint module of the redundancy removal engine configured to generate through a hash identifier of at least one portion of data of the contiguous data block stored in the cache memory based on a identifier constraint. The size of contiguous data block is larger than the size of the at least one portion of data of the contiguous data block for which the hash identifier is generated. Each contiguous data block to have a plurality of hash identifiers that represent a plurality of different portions of data of the contiguous data block for which the hash identifier is generated. The system also includes a second network element comprising another redundancy removal engine configured to receive the compressed data stream transmitted from the first network element, reconstruct the data stream and/or forward the data stream to a destination network element. The compressed data stream is in the form of at least one of a set of redundancy instructions.

BRIEF DESCRIPTION OF FIGURES

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or system of data compression through redundancy removal in an application acceleration environment. Although the present embodiments have been described with reference to specific example embodiments, it will be evident that various modifications and changes may be made to these embodiments without departing from the broader spirit and scope of the various embodiments.

Figure 1:
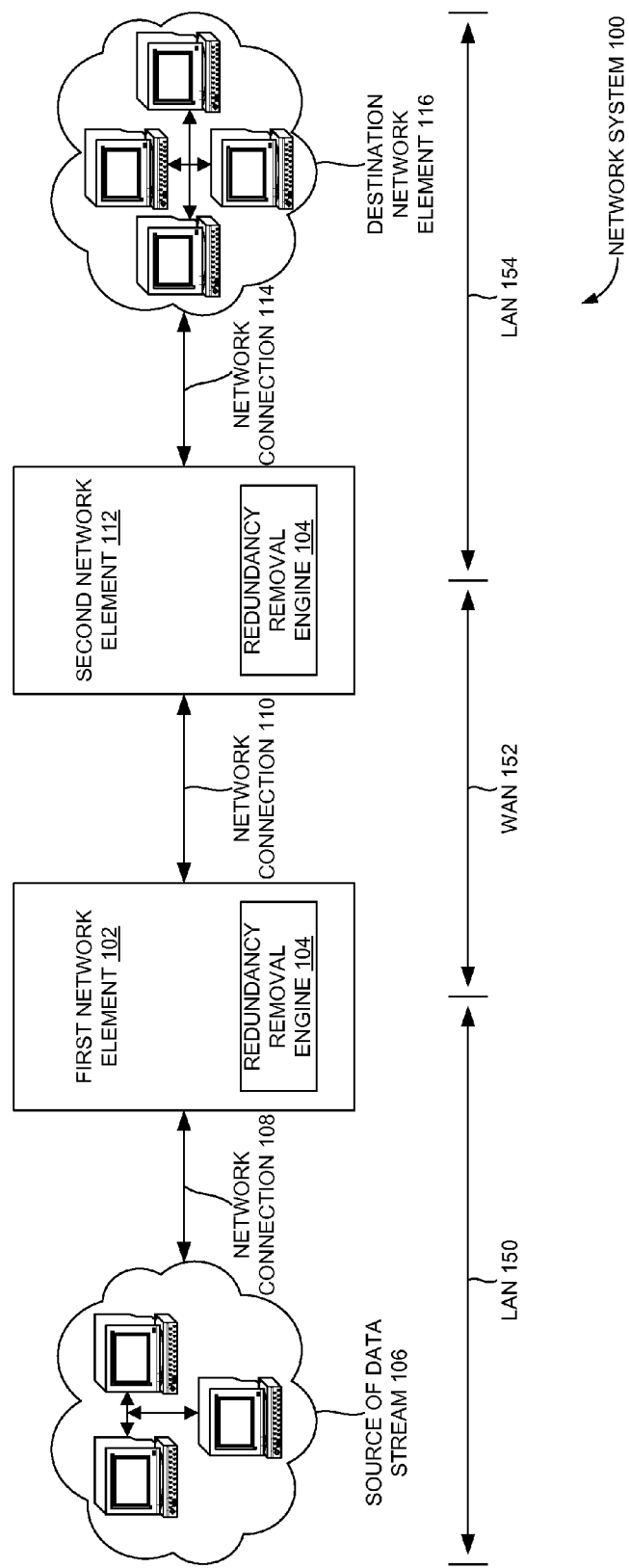
FIG. 1 illustrates a system view of a data de-duplication network, according to one of more embodiments.

FIG. 1 illustrates a system view of a data de-duplication network, according to one of more embodiments. In particular, FIG. 1, illustrates a source of a data stream 106, a first network element 102, a second network element 112, a destination network element 116, a redundancy removal engine 104, a first WAN network 150, a second WAN network 154, a core WAN network 152, a first network connection 108, a second network connection 110 and a third network connection 114.

In one embodiment, a source of data stream 106 may be a client site and/or server site. In one embodiment, the client site may be a branch office associated with a headquarters office. In one embodiment, the server site may be a headquarters office of an enterprise. In one embodiment, the client site may have one or more of a number of personal computers, server computers and/or personal communication devices. In an example embodiment, the client site may have laptops, desktops, PDAs, etc. In one embodiment, data may be transferred between the source of data stream 106 and a destination network element 116. In one embodiment, the destination network element 116 maybe a network element in a headquarters site and/or a branch site. In one embodiment, the destination network element 116 may be the server computer, a personal computer and/or a personal communication device. In one embodiment, the destination network element maybe a destination router, edge router and/or core router that may be communicatively coupled to a LAN and/or a WAN network to which the source of data stream 106 may want to transmit data. In an example embodiment, when the source of data stream 106 may be a server, the client site (e.g, destination network element 116) may have requested a data from the server. In one embodiment, the server and/or the client site may be a LAN network. The server (e.g., source of data stream 106 may transmit the requested data to the client (e.g., destination network element 116 as per the request from the destination network element 116 (client)).

In one embodiment, the data may be transmitted as packets over the network connections 108, 110 and/or 114. In one embodiment, the network connections may couple the source of data stream 106, the first network element 102, the second network element 112 and/or the destination network element 116. In one embodiment, the first network connection 108 may be a LAN network connection that communicatively couples the source of data stream 106 with the first network element 102. In the embodiment of FIG. 1, the network between the source of the data stream 106 and the first network element 102 may be a WAN 150 network. In another embodiment, the network between the source of the data stream 106 and the first network element 102 may be a LAN network. In the embodiment of FIG. 1, the second network connection 110 may couple the first network element 102 to the second network element 112. In one embodiment, the second network connection 110 may be a WAN 152 connection. In another embodiment, the network coupling the first network element 102 and the second network element 104 may be a LAN network. The WAN network 152 may be a core network and/or an edge network. The WAN network 152 may be a core network if first network element 102 and the second network element 112 are communicatively coupled through core routers via the second network connection 110. The WAN network 152 may be an edge network if the first network element 102 and the second network element 112 may be communicatively coupled through at least one edge router via the second network connection 110. In one embodiment, the third network connection 114 may be a WAN network connection that communicatively couples the second network element 112 with the destination network element 116. In the embodiment of FIG. 1, the network between the second network element 112 and the destination network element 116 may be a WAN 154 network. In another embodiment, the network between the second network element 112 and the destination network element 116 may be a LAN network. In one embodiment, the network connections 108, 110 and/or 114 may be a wired communication link and/or a wireless communication link.

In one embodiment, data may be transmitted between a source of data stream 106, a first network element 102, a second network element 112 and/or the destination network element 116 through routers communicatively coupled to each of the above mention elements. The router may be an edge router, a core router and/or customer premise equipment router. In one embodiment, each of the source of data stream 106, a first network element 102, a second network element 112 and/or the destination network element 116 may be communicatively coupled to at least one router to transmit data between the said devices. In one embodiment, the router may be inbuilt into the source of data stream 106, a first network element 102, a second network element 112 and/or the destination network element 116. In one embodiment, the router may be a software module and/or a hardware device that routes data between the source of data stream 106, a first network element 102, a second network element 112 and/or the destination network element 116.

In one embodiment, each network connection may have multiple TCP connections. In one embodiment, the redundancy removal engine 104 through data de-duplication may compress data streams across different TCP connections.

In one embodiment, network elements that include the redundancy removal engines may be placed at both ends of a bandwidth constrained channel (e.g., second network connection). In one embodiment, the channel may be an access link, wireless link, end to end network path between a proxy and a server and/or a server and a client. In one embodiment, each of the redundancy removal engines may replace repeated strings of a data stream with redundancy instructions that are smaller in data size and/or forward them to the other end of the channel where they may be reconstructed through the redundancy removal engine that received the redundancy instructions on the other end of the channel.

In one embodiment, the every network connection may need to have network element having redundancy removal engine on both ends of the network connection to optimize the network connection through data de-duplication. The network element may be a customer premise equipment or a point of presence. The network element may include the redundancy removal engine. In one embodiment the three segment network shown in FIG. 1 having first network connection segment, second network connection segment and third network connection segment may need a first customer premise equipment (not shown in FIG. 1) between the client and first network element to reduce a latency of the first network connection through the redundancy removal engine and/or a second customer premise equipment (not shown in FIG. 1) between the second network element and the server to optimize the third network connection. In such an embodiment, the network connection between the first customer premise equipment and the first network element may be a WAN connection. The network connection between the second network element 112 and the second customer premise equipment may be a WAN connection as well. The network connection between the client and the first customer premise equipment may be a LAN connection and the network connection between the second customer premise equipment and the server may be a LAN network.

In one embodiment, the first network element 102 and/or the second network element 112 may be a hardware device comprising the redundancy removal engine 104. In the embodiment of FIG. 1, the first network element 102 and/or the second network element 112 may be a point in presence (POP) system. The first network element 102 and/or the second network element 112 may compress the data associated with a data stream 202 received from the source of the data stream 106 before transferring the data to the destination network element 116 as illustrated in FIG. 2.

Figure 2:
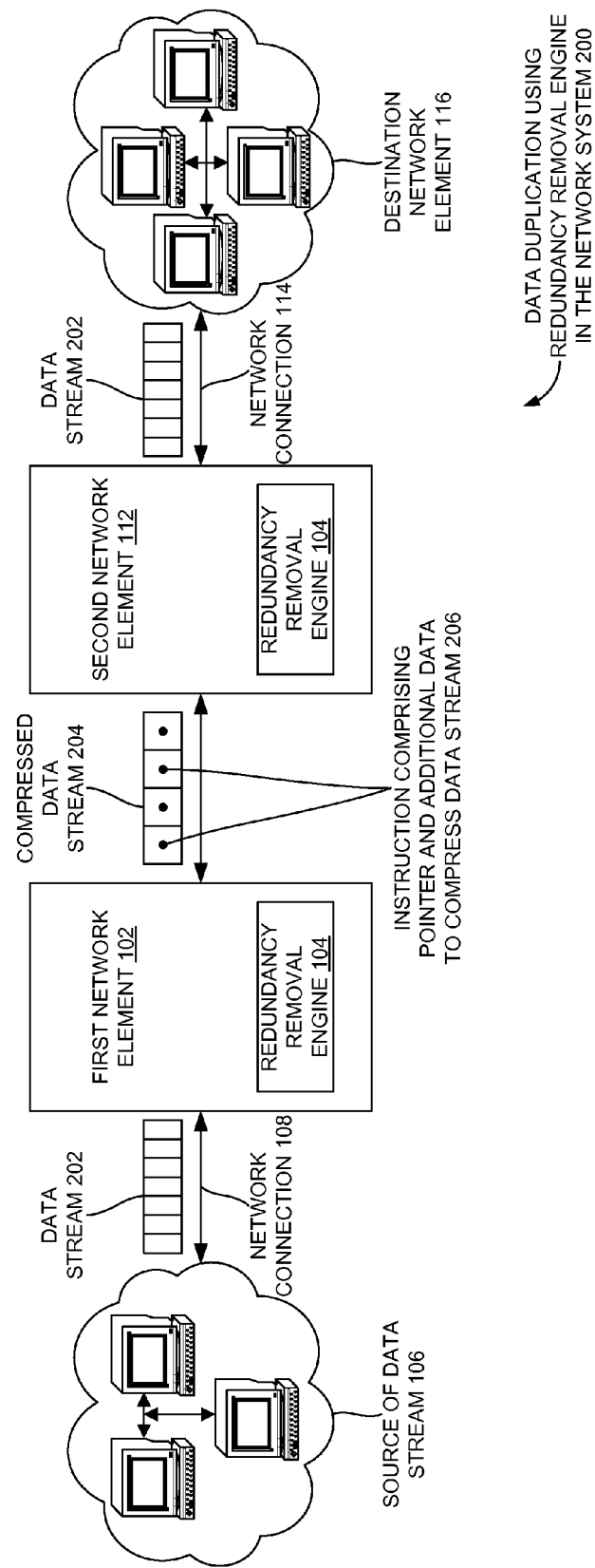
FIG. 2 illustrates data compression based on the redundancy removal engine, according to one or more embodiments.

Now refer to the embodiment of FIG. 2 and FIG. 1. FIG. 2 illustrates data compression based on the redundancy removal engine, according to one or more embodiments. In particular, FIG. 2 illustrates the source of data stream 106, the first network connection 108, the first network element 102, the redundancy removal engine 104, the second network connection 110, the second network connection 112, third network connection 114, the destination network element 116, the data stream 202, the compressed data stream 204 and/or instruction comprising a pointer and additional data to compress the data stream 206.

In one or more embodiments, the data compression through the first network element 102 and/or the second network element 112 via the redundancy removal engine 104 may be data de-duplication based compression. The first network element 102 may transmit the compressed data stream 204 to the destination network element 116 via the second network element 112 and/or the second network element 112. In one embodiment, the compressed data stream may include a set of redundancy instructions that may replace a portion of data of data stream that includes the a redundant portion of data. In one embodiment, the second network element 112 may the destination network element if the final destination of the data received from the source of data stream 106 is the second network element 112.

In one embodiment, the data stream 202 may be a sequence of digitally encoded coherent signals (e.g., data packets) used to transmit or receive information in the process of being transmitted. In one embodiment, a redundant portion of data may be compressed through replacing the redundant portion of data associated with the data stream 202 with a set of instructions that includes a pointer identifier that represents a block of data (shown in FIG. 6) associated with the portion of data that is redundant. The instructions 206 may be illustrated in FIG. 5. In one embodiment, each of the first network element 102 and the second network element 112 may perform a compression and/or decompression operation on the data stream 202 and/or the compressed data stream 204.

In the embodiment of FIG. 2, the source of data stream 106 transmits a data stream 202 to the destination network element 116 via the first network element 102 and/or the second network element 112. In one embodiment, the data stream 202 is transmitted to the first network element (e.g., POP). In one embodiment, the first network element 102 may be in a customer premise. In another embodiment, the first network element 102 may be in a network outside of the customers premise. The first network element may receive the data stream 202 transmitted from the source of data stream 106. In one embodiment, the redundancy removal engine 104 of the first network element may compress the data stream based on various criterions if the data stream has redundant data. The compressed data stream 204 may be transmitted to the destination network element 116 through the second network element. In one embodiment, the compressed data stream 204 may be transmitted to the destination network element 116 directly.

In the embodiment, where the compressed data stream 204 may be transmitted to the destination network element 116 directly, the destination network element 116 may have a decompression module to decompress the data to form the data stream 202 transmitted by the source of the data stream 106. In one embodiment, the second network element 112 may receive the compressed data stream 204. In one embodiment, the redundancy removal engine 104 of the second network element 112 may decompress the compressed data stream 204 before transmitting the data stream 202 formed from the decompressed data stream 204 to the destination network element 116. In one embodiment, the second network element 112 may not decompress and rather forward the compressed data stream 204 to the destination network element 116. In one embodiment, the compressed data stream 204 may be decompressed in the destination network element 116. In one embodiment, the first network element 102 and/or the second network element 112 may perform other services including the data de-duplication.

Figure 3:
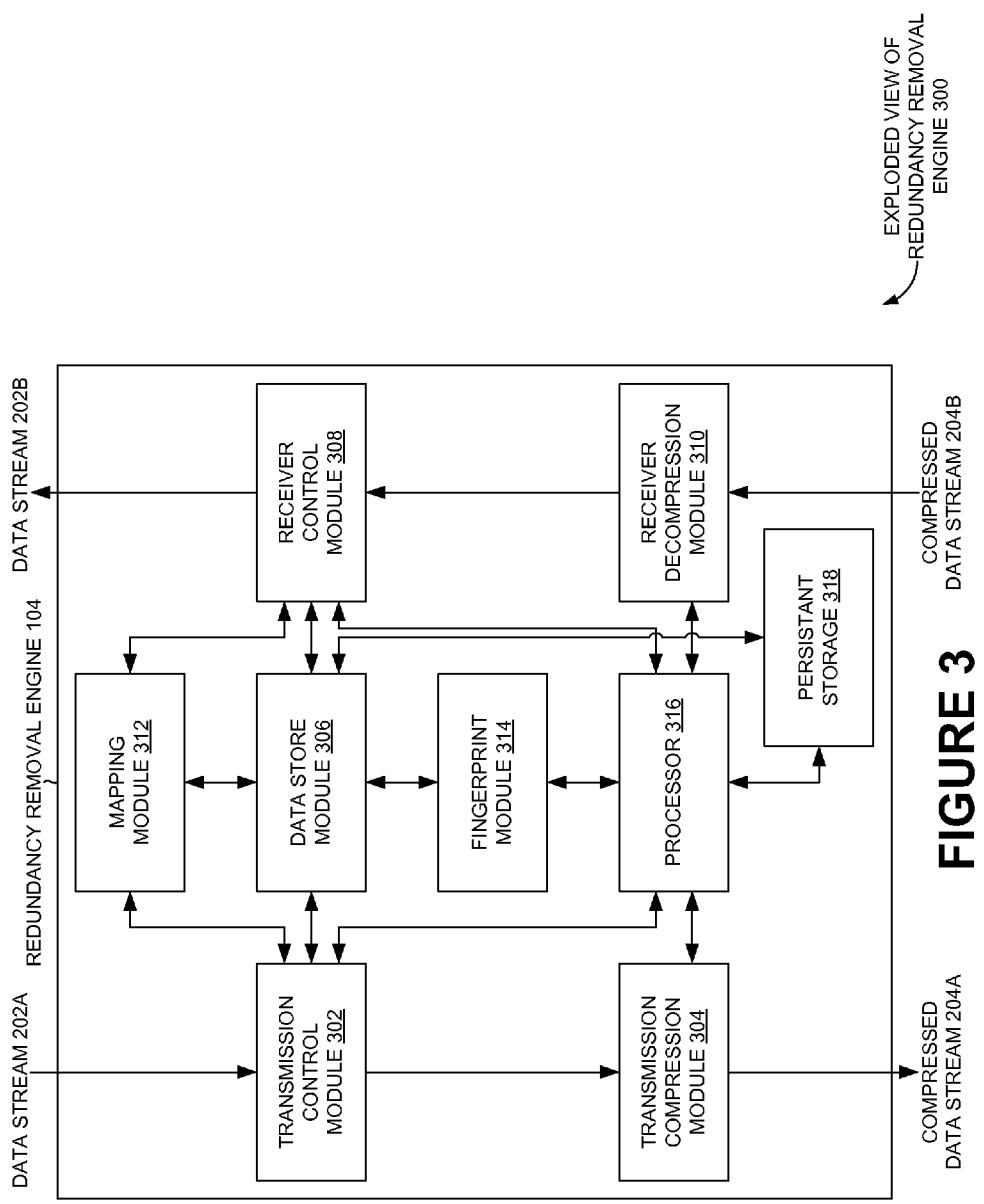
FIG. 3 illustrates an exploded view of the redundancy removal engine of FIG. 1, according to one or more embodiments.

Now refer to FIG. 3 and FIG. 1. FIG. 3 illustrates an exploded view of the redundancy removal engine 104 of FIG. 1, according to one or more embodiments. In particular FIG. 3 illustrates a data stream $202_a$, a transmission control module 302, a transmission compression module 304, a compressed data stream $204_a$, a mapping module 312, a data store module 306, a fingerprint module 314, a processor 316, a persistent storage 318, a compressed data stream $204_b$, a receiver decompression module 310, a receiver control module 308 and/or a data stream $202_b$.

In one embodiment the redundancy removal engine 104 may be a software module. In one embodiment, the redundancy removal engine 104 may be a hardware device. In one embodiment, the redundancy removal engine 104 may be a combination of a hardware device and/or a software module. In one embodiment, when the redundancy removal engine 104 is a software module, the redundancy removal engine 104 may be represented by a set of machine readable instructions that may be executed through a processor 316 of the redundancy removal engine 104. In one embodiment, the machine readable instructions may be executed by a processor of the network element (102 and/or 112) associated with the redundancy removal engine 104. In one embodiment, the processor 316 may be a part of the transmission compression and/or receiver decompression module. In one embodiment, the machine readable instructions may be executed by the transmission compression module and receiver decompression module associated with the redundancy removal engine 104.

In the embodiment of FIG. 2, the redundancy removal engine 104 may receive a data stream 202 from the source of the data stream 106. In one embodiment, the redundancy removal engine 104 may store a contiguous data block 602 (shown in FIG. 6) associated with a data stream 202 in a bidirectional cache memory 410 (shown in FIG. 4) of the first network element 102. In one embodiment the bidirectional cache memory 410 may be associated with a data store module 306 of a redundancy removal engine 104 associated with a first network element. In one embodiment, the contiguous data block may be a fixed size data block. In an example embodiment, the contiguous data block may be an 8 Kbyte data block.

Figure 6:
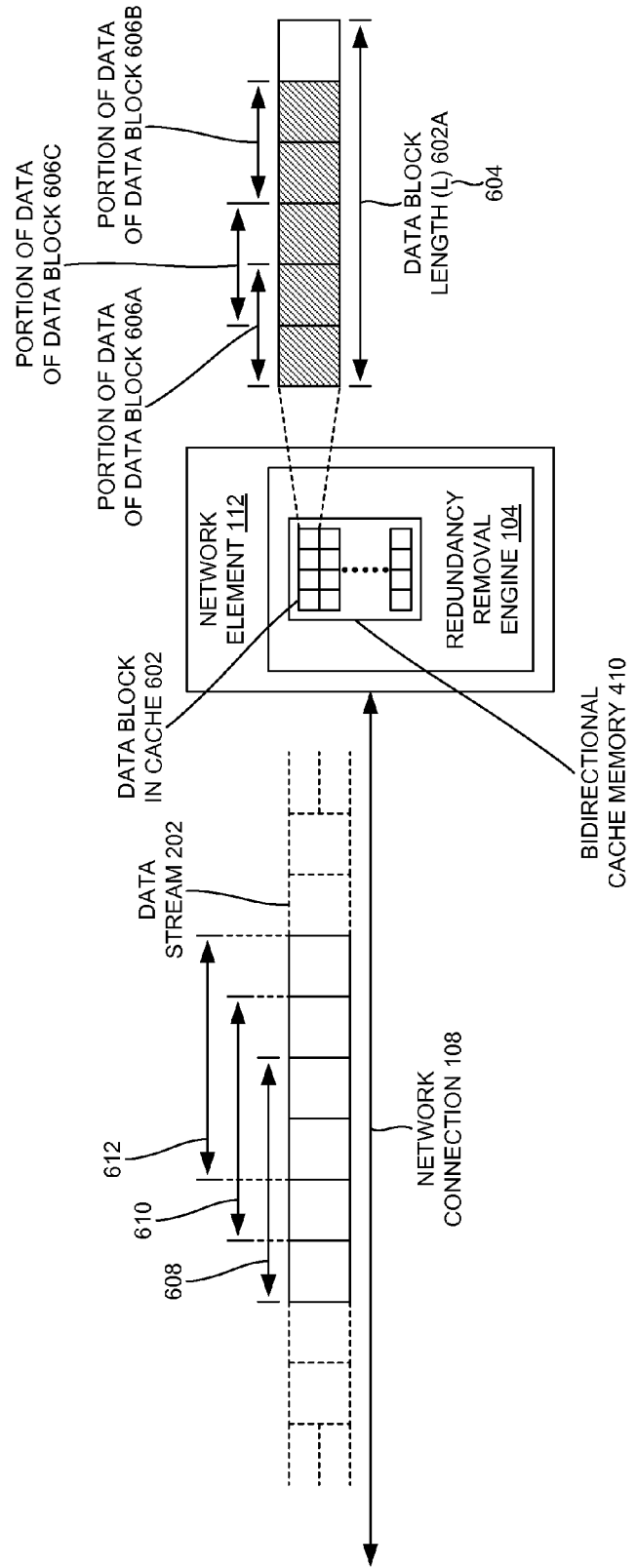
FIG. 6 illustrates data storage in a bidirectional cache memory of the redundancy removal engine shown in FIG. 3, according to one or more embodiments.
Figure 7:
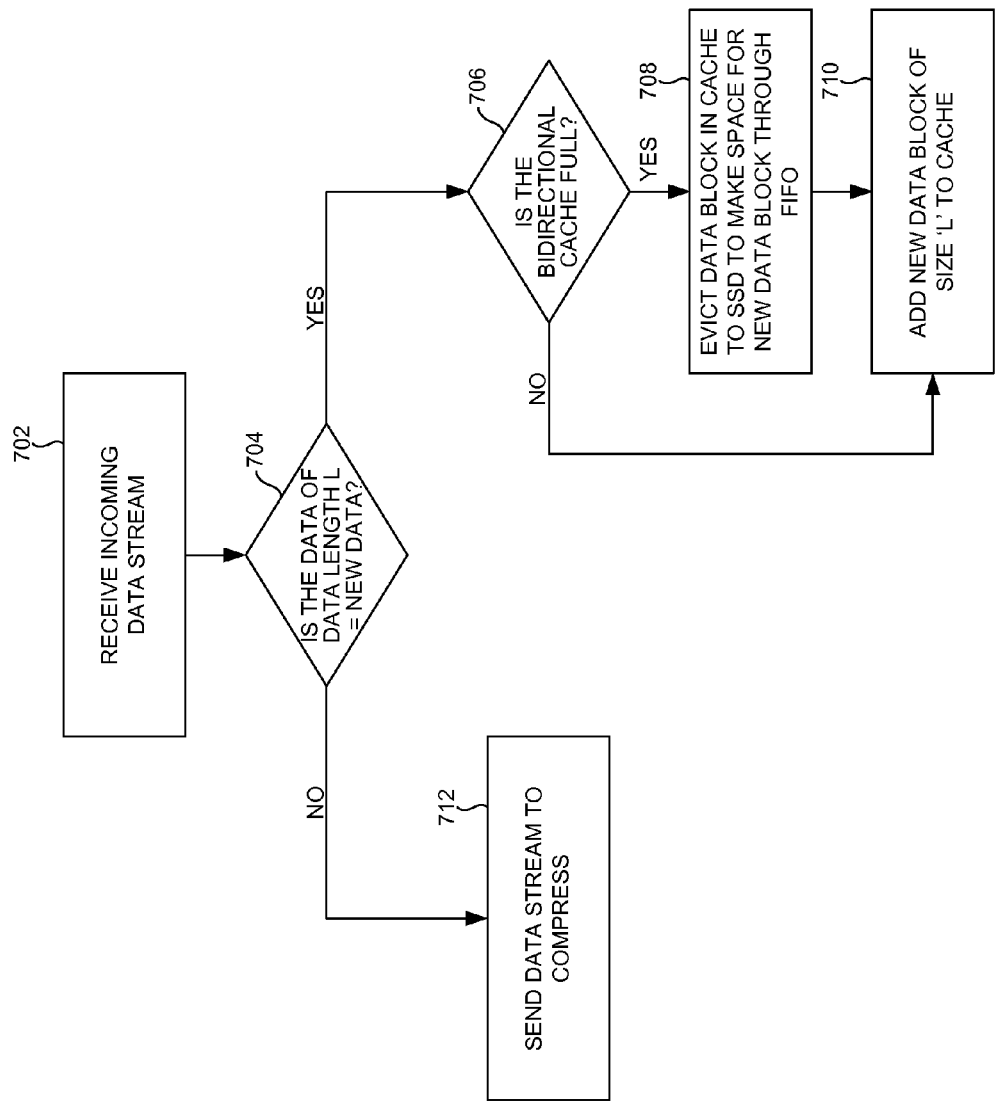
FIG. 7 is a process flow diagram illustrating storing a data block associated with a data stream in a bidirectional cache memory of the redundancy removal engine of FIG. 3, according to one or more embodiments.

Now refer to FIG. 6 and FIG. 7 for data storage in bidirectional cache memory 410 associated with the redundancy removal engine shown in FIG. 3. FIG. 6 illustrates data storage in a bidirectional cache memory of the redundancy removal engine shown in FIG. 3, according to one or more embodiments. In particular FIG. 6 illustrates a data stream 202, a first network connection 108, a scanned data of the data stream 608, 610 and/or 612, a first network element 102, a redundancy removal engine 104, a bidirectional cache memory 410, data block stored in the bidirectional cache memory 602, length of data block 604 and/or portion of data of the data block $606_a$, $606_b$ and/or $606_c$.

In one embodiment, the first network element 102 may receive the data stream 202. In one embodiment, a fixed length (e.g., data size of the portion of data for which hash identifier is generated) of the data stream may be scanned to find new data. In the embodiment of FIG. 6, the data stream may be scanned byte by byte represented as 608, 610 and 612. In one embodiment, the scan length may be equal to the size of data block 604 stored in the bidirectional cache memory 406. In one embodiment, the scan may be after every length of data block. For example, a hash identifier of a data stream corresponding to a 128 Byte (e.g., fixed size) portion of data of the data stream (e.g., 608) may be generated. The hash identifier may be compared with a hash identifier of a data block 604 that has been indexed. If the hash identifier matches then the data is sent for further compression. If the hash identifiers do not match, the portion of data of the data stream 608 whose hash identifier does not match with the indexed hash identifier may be held in a holding queue (not shown in Figure). Then, the next 128 Byte portion of data of the data stream (e.g., 610) may be generated and compared with the indexed hash identifier associated with the data block 604. If the hash identifiers do not match the portion of data of the data stream 610 may be held in the holding queue along with the portion of data 608. In one embodiment, generating hash identifier and comparing with the indexed hash identifiers may be considered as scanning the data stream. Once the size of the data in the holding queue becomes equal to the size of a data block it may be rendered as new data. In one embodiment, if the data stream is finite and ends before the size of the data in the holding queue is equal to the size of a data block, the existing data in the holding queue which may be smaller than the size of a data block may be rendered as a new data and a pointer identifier may be issued to the new data.

In one embodiment, new data may be data that is unique and different from the data that is stored in the bidirectional cache memory 410. In one embodiment, if the bidirectional cache memory 410 does not have any data stored then the first incoming portion of data equivalent to the size of a data block may be stored in bidirectional cache memory 406 as new data. In another embodiment, the new data may be determined based on a preset criterion. In some embodiments, The portion of data of the data stream that is scanned to determine a new data may be compared to the preset criterion to determine if the data in the scanned block of data is new. If the data is new then the scanned block of data is stored in the bidirectional cache memory 410.

In one embodiment, a hash identifier of a portion of data of the incoming data stream 202 may be generated. In one embodiment, the portion of data of the incoming data stream 202 may be scanned to find a match between the indexed hash identifiers associated with the data block stored in the bidirectional cache memory and the hash identifiers associated with the portion of data of the incoming data stream 202. In one embodiment, if the hash identifier associated with the portion of data of the data stream matches with the indexed hash identifier then portion of data of the data stream may be forwarded to find a maximal match portion for compression. The term indexed hash identifier, hash identifier that is indexed and index of hash identifier may be used interchangeably. The terms hash identifier that is indexed and/or index of hash identifier may all refer to indexed hash identifier and may all mean the same.

In one embodiment, if the hash identifier associated with the portion of data of the data stream does not match with the indexed hash identifier then the transmission compression module may hold the portion of data associated with the data stream whose hash identifier does not match with the indexed hash identifier in a holding queue (not shown in FIG. 6). In one embodiment, if the hash identifier associated with the portion of data of the data stream does not match with the indexed hash identifier then the transmission compression module may hold the portion of data and continue to scan the next portion of data of the data stream till it finds a match between the hash identifier of the portion of data that is currently scanned and the indexed hash identifier and/or continues generating hash identifiers of the portion of data of data stream and scanning till the queue length of the portion of data that is held in the holding queue may be equal to the size (e.g., data size or length 604) of a data block. In one embodiment, the portion of data of the data stream that is scanned may be contiguous. In one embodiment, the contiguous portions of data of the data stream whose hash identifiers may not match with the indexed hash identifiers may be appended to each other sequentially in the order in which they may be scanned. In one embodiment, when the size of the portion of data in the holding queue may be equal to the size of the data block 604 the portion of data may be considered as new data. In one embodiment, the new data may be assigned a pointer identifier and nearly simultaneously stored in the bidirectional cache memory. In one embodiment, nearly simultaneously a write instruction may be issued to both the bidirectional cache memory 406 and the persistent storage module. In one embodiment, the holding queue may be cleared once the portion of data (new data) held in the holding queue may be stored in the bidirectional cache memory 406.

In one embodiment, new data may be identified when a fixed set contiguous hash identifiers of a data stream 202 does not match the indexed hash identifiers. In one embodiment, the fixed set of contiguous hash identifiers may be associated with a contiguous portion of data of the data stream. In one embodiment, the hash identifiers 608, 610 and 612 may not match the indexed hash identifiers the data block from the start of 608 to the end of 612 may be considered as a new data block and may be stored as a data block in the bidirectional cache memory. The length of the data block and/or the number of set of contiguous hash identifiers that may be scanned to determine a new data block may depend on the size of the bidirectional cache memory. In an example embodiment, maybe 10 contiguous hash identifiers may be compared to indexed hash identifiers to determine the new data block. In the example embodiment, if the 10 contiguous hash identifiers may not match the indexed hash identifiers, then the contiguous portion of data represented by the 10 contiguous hash identifiers may be stored as data block with new data. In the example embodiment, the 10 contiguous hash identifiers may represent 128 Kbytes of contiguous data of the data stream that may be stored as data block with new data.

In one embodiment, a portion of data the data block 602 stored in the bidirectional cache memory 410 may be represented as $606_{a-c}$, in the embodiment of FIG. 6. In one or more embodiments, the portion of data 606 of the data block 602 may be smaller is size than the size of the data block. In one embodiment, the hash identifiers associated with the portion of data of the data block that are indexed may be non-overlapping. In an example embodiment, the portion of data 606 may be 128 bytes and the size of the data block may be 8 Kbytes. In one embodiment a hash of the portion of data 606 may be generated to determine redundant portion of data in the data stream 202 and thereby compressing the data stream 202 as illustrated in FIG. 8.

FIG. 7 is a process flow diagram illustrating storing a data block associated with a data stream in a bidirectional cache memory of the redundancy removal engine of FIG. 3, according to one or more embodiments. In the embodiment of FIG. 7, in operation 702 the redundancy removal engine 104 associated with the network element (e.g., first network element 102) may receive the data stream 202. In one embodiment, in operation 704, a contiguous block of data (e.g., 608, 610 and/or 612) of length '1' 604 of the data stream 202 may be scanned to determine if the contiguous data block is a new data. In one embodiment, the contiguous block of data may be compared to data block that is stored in the bidirectional cache memory 410 of the redundancy removal engine 104. In one embodiment, if the contiguous data block is determined to have new data then in operation 706 the bidirectional cache memory 410 may be checked to determine if the bidirectional cache memory 410 is full. In one embodiment, when the bidirectional cache memory 410 is full, in operation 708 the bidirectional cache memory 410 is evicted to make space to store the contiguous data block that is determined to have a new data in operation 704. In one embodiment, the bidirectional cache memory 410 is flushed in a first in first out (FIFO) manner. In one embodiment, the first data block that is stored may be flushed out. In one embodiment, the flushing out of data blocks to make space for the new data block may be based on other criteria as well, such as last in first out (LIFO), most commonly occurring data blocks are preserved etc. In one embodiment, the data block that is flushed from the bidirectional cache memory 410 is stored in the persistent storage 318 of FIG. 3. In one embodiment, once the data block is flushed to the persistent storage, in operation 710 the new data block may be stored in the bidirectional cache memory 410. In one embodiment, in operation 706, if it is determined that the bidirectional cache memory 410 is not full, then the new data block is stored in the bidirectional cache memory 410 as in operation 710 and/or the persistent storage nearly simultaneously.

In one embodiment, once the data block comprising the new data is stored in the bidirectional cache memory 406, nearly simultaneously it is determined whether there is sufficient space in the persistent storage to write the data block comprising the new data that is stored in the bidirectional cache memory. In one embodiment, if there is sufficient space the data block is committed (e.g., write data to persistent storage) to the persistent storage.

Figure 8:
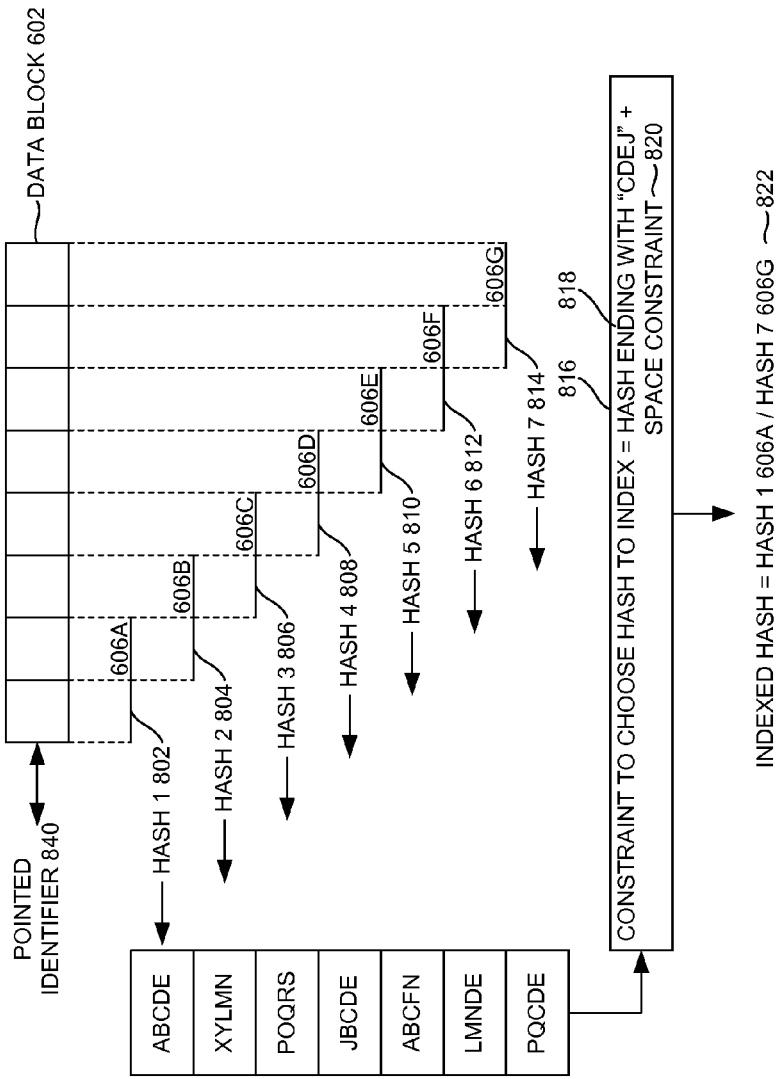
FIG. 8 illustrates generating a hash of a portion of data of the data block stored in the bidirectional cache memory of the redundancy removal engine, according to one or more embodiments.

In one embodiment, in operation 704 if it is determined that the contiguous block of data associated with the data stream 202 is not new data, the data stream is forwarded to obtain a maximal match portion of data of the data stream for compression in operation 712 as shown in FIG. 8.

Now refer to FIG. 8, FIG. 3 and FIG. 1. FIG. 8 illustrates generating a hash of a portion of data of the data block stored in the bidirectional cache memory of the redundancy removal engine, according to one or more embodiments. In one embodiment, a hash of a portion of data of the data block 602 may be generated. In one embodiment, the hash may be a hash identifier. In one embodiment, the hash identifier may identify the portion of data of which the hash is generated. In one embodiment, the portion of data of the data block of which the hash is generated is smaller than the size of the data block 602. In an example embodiment, the size of the data block may be 8 KBytes and the size of the portion of data of which the hash is generated may be 128 Bytes. In the example embodiment, each data block 602 may have at least 64 hash identifiers associated with the data block 602. In one embodiment, each data block 602 may be represented by the pointer identifier 840. In one embodiment, the pointer identifier 840 may identify the data block 602 associated with the pointer identifier 840. In one embodiment, the pointer identifier 840 for the data block 602 may be generated through the mapping module 312 (shown in FIG. 3) of the redundancy removal engine 104. In one embodiment, the hash identifier may be associated with the pointer identifier associated with the data block 602 of which the hash is generated. In one embodiment, the pointer identifier table of the data store module 306 illustrated in FIG. 4 may generate the pointer identifier.

In one embodiment, the hash of the portion of data of the data block 602 may be generated based on a Rabin-Karp hash algorithm. In one embodiment, any computationally efficient hashing algorithms may be used as well to generate the hash identifier. In one embodiment, each of the generated hash (e.g., hash1 802, hash2 804, hash7 814, etc.) of the data block 602 may be an N-bit hash. In an example embodiment, N-bit hash may be a 40 bit Rabin-Karp hash. In an example embodiment of FIG. 8, the 40-bit hash identifier 1 802 may be represented as "abcde" and so on. In one embodiment, the length of portion of data and/or size of portion of data of the data block of which the hash is generated may be determined based on a requirement of the network and/or the required compression ratio. In one embodiment, the length of portion of data and/or size of portion of data of the data block of which the hash is generated may be smaller than the size of the data block. In one embodiment, thereby each data block 602 may have at least one hash identifier. In one embodiment, each data block 602 may have a number of hash identifiers. In one embodiment, each hash identifier represents a different portion of data of the data block for which the hash is generated. In the embodiment of FIG. 8, hash1 802 represented as "abcde" is the hash of the portion of data $606_a$ of the data block 602, whereas hash5 810 represented as "abcfn" is a hash of the portion of data $606_e$ of the data block 602.

In one embodiment, once the hash identifiers associated with the data block are generated, at least one hash identifier is selected from the number of hash identifiers (e.g., hash1 $606_a$, hash2 $606_b$, hash3 $606_c$, hash7 $606_g$ etc.) based on a sparsity constraint. In one embodiment, the at least one hash that is selected may be indexed. In one embodiment, a most significant bit rule of the sparsity constraint may be applied to select the at least one hash identifier to index from the number of hash identifiers mentioned above. In one embodiment, based on the most significant bit rule the at least one hash identifier is selected when an equivalent value of a threshold number of the most significant bits of the hash identifier of the portion of data of the contiguous data block 602 is determined to be equal to a predetermined value. In the example embodiment of FIG. 8, the constraint 816 that is used to choose the hash identifier that may be indexed is that the hash identifiers that end with "cde" 818 are the hash identifiers that may be indexed. In one embodiment, once the said constraint is applied, a space constraint 820 may be applied to the hash identifiers that pass through the criterion 818 of ending with "cde". In one embodiment, the constraints may be applied to the number of hash identifiers to limit the number of hash identifiers that are indexed. In one embodiment, limiting the hash identifiers that are indexed may reduce the size of a storage medium needed to efficiently compress the data stream through data deduplication. In the example embodiment, the indexed hash 822 after passing the number of hash identifiers through the said constraints are hash1 $606_a$ and hash7 $606_g$. In the example embodiment of FIG. 8, 2 hash identifiers from the 7 hash identifiers are selected to index after applying the criterion. In an example embodiment, the most significant bit rule of the sparsity constraint may be to select the hash identifier when a particular few bits of the hash identifier is binary zero (0). In the said example embodiment, when the hash identifier is a 40 bit Rabin Karp hash identifier, the hash identifier is selected to be indexed and/or is defined as a valid hash if the last 8 bits (bit 32 to bit 39, assuming first bit is bit 0) is binary zero (0).

In one embodiment, along with hash identifier the transmission control module 302 may append a threshold number of bits to the hash identifier. In one embodiment, the threshold number of bits may be priority bits. In one embodiment, an indexed hash identifier may be evicted from the index based on the priority of the indexed hash identifier. In one embodiment, the priority of the indexed hash identifier may be determined based on the value of the threshold number of bits appended to the indexed hash identifier. In one embodiment, the index that includes the indexed hash identifiers may not be able to hold all the indexed hash identifiers. In one embodiment, the threshold number of bits associated with the priority may allow proper thinning of the index. In one embodiment, the index may not be able to hold all the hash identifiers from every data block stored in the bidirectional cache memory. In one embodiment, indexed hash identifiers may be evicted to manage the index based on the threshold number of bits associated with the priority. In one embodiment, the thinning may effectively reduce the number of hash identifiers that are indexed per data block. In one embodiment, the comparison of hash identifiers to find a match may exclude the priority bits.

In one embodiment, once the most significant bit criterion is applied, the distance rule of the sparsity constraint is applied to further reduce the number of hash identifiers that are indexed. In one embodiment, based on the distance rule the hash identifier is indexed if the portion of data of the contiguous data block 602 represented through the hash identifier is spaced at least a threshold data size distant from another portion of data of the contiguous data block represented through another hash identifier that is indexed. In one embodiment, the number of hash identifiers that are indexed are reduced to decrease the memory space associated with the network element consumed through indexing the hash identifiers. In one embodiment, the distance rule may select hash identifiers based in a condition that subsequent hash identifiers whose portion of data that is represent by the hash identifier is spaced more than a threshold data size. In an example embodiment, if the portions of data of the data block represented by subsequent hash identifiers may not be within 1 KByte.

In an example embodiment, if a data block is 8 KB (Kilo Bytes) and the portion of data of the data block of which a hash identifier is generated is 128 Bytes, if the most significant bit rule of last 8 bits being zero is applied, then the number of hash identifiers will be limited to 64 hash identifiers to be indexed per data block. Now in the example embodiment, the number of indexed hash identifiers may be reduced to 8 hash identifiers per data block based on the distance rule of portions of data represented by subsequent hash identifiers that are indexed may not be within 1 KByte.

In one embodiment, the sparsity constraint may index hash identifiers in such a way the indexed hash identifiers provide a probabilistically good coverage of each data block. In one embodiment, the hash identifier may be used as pointers into the data stream 202 to find portions of redundant data. In one embodiment, the hash identifiers may be indexed in the fingerprint module 312. In one embodiment, the index of hash identifiers may map each hash identifier that is indexed to a portion of data of the data block stored in the bidirectional cache memory 410. In one embodiment, the indexed hash identifiers may be anchors that may be used to find larger regions of redundant data in the data stream 202, both before and after the portion of data represented by the hash identifier that is indexed. In one embodiment, the index of hash identifier of a portion of data of data block may be a mapping from a hash identifier associated with the portion of data of the data block to a pair of a pointer identifier associated with the data block and an offset within the data block associated with the hash identifier. For example, if the hash identifier for data block 100 starting at offset 812 byte is 0x12CDE, then the index of the hash identifier is 0x12cde→(100,812).

Referring back to FIG. 3, in one embodiment a hash identifier of at least one portion of data ($606_{a-n}$) of a contiguous data block 602 stored in a bidirectional cache memory 410 may be generated based on an identifier constraint through a fingerprint module 314 of the redundancy removal engine 104. In one embodiment, the size of contiguous data block 602 may be larger than the size of the at least one portion of data ($606_{a-n}$) of the contiguous data block for which the hash identifier 802-814 is generated. In one embodiment, each contiguous data block may have a number of hash identifiers 9802-814). In one embodiment the identifier constraint may determine the size of the portion of data of the data block for which the hash identifier is generated. In an example embodiment, the size of the contiguous data block may be 8 KB and the size of the portion of data 606 for which the hash identifier is generated may be 128 B. In the example embodiment, the identifier constraint may determine that the size of the portion of data for which the hash identifier is generated may be 128 Bytes. In another example embodiment, the size of the portion of data for which the hash identifier is generated may be greater than 128 Bytes but lesser than 8 KB. In one embodiment, the identifier constraint may depend on a required compression ratio and/or a memory size constraint of the network element. In one embodiment, the identifier constraint based on which at least one of the hash identifier of portion of data of the contiguous data block stored in the bidirectional cache that is indexed and the hash identifier of the portion of data of the data stream is generated may be a hashing algorithm. In one embodiment, the hashing algorithm may be a Rabin Karp hash algorithm that generates a Rabin Karp hash.

In one embodiment, at least one hash identifier of the number of hash identifiers 802-814 that is generated through the fingerprint module 314 may be selected through a transmission control module 302 of the redundancy removal engine 104 to index the at least one hash identifier based on a sparsity constraint 816. In one embodiment, selecting at least one hash identifier to index the hash identifier may reduce the number of hash identifiers required to be indexed for the data de-duplication process (e.g., compression). In one embodiment, the index of the hash identifier may be stored in the fingerprint module. In one embodiment, the data stream may be compressed by replacing the portion of data of the data stream that is redundant with an instruction comprising the pointer identifier and/or additional information through a transmission compression module 304 of the redundancy removal engine 104. In one embodiment, the data stream may be compressed based on the hash identifier that is indexed.

In one embodiment, the transmission control module 302 may generate a set of descriptors. In one embodiment, the set of descriptors may be a set of instructions that may include internal instructions for the redundancy removal engine 104 and/or instructions associated with the compression. The instructions that are associated with the compression may be transmitted to a remote peer of the redundancy removal engine 104. In one embodiment, the remote peer of the redundancy removal engine 104 of first network element 102 may be the redundancy removal engine 104 associated with the second network element 112. In one embodiment, the set of descriptors may be a superset of set of instructions. In one embodiment, the transmission control logic 302 may analyze the data stream 202 received from the source of data stream 106 and/or convert the data stream 202 to set of descriptors. In one embodiment, the transmission compression module 304 may encode and/or convert the set of descriptors to a set of instructions. In one embodiment, the transmission compression module may also optimize the descriptors. For example, if the transmission compression module receives descriptors E(0, 1300), E(1300, 1300), E(2600, 1300), E(3900, 1300), E(5200, 1300), E(6500, 1300), E(7800, 324) for the same pointer identifier associated with a data block, the transmission compression module may combine the descriptors to appear as E(0, 8192) instead of transmitting the 7 instructions to the remote peer over the network. In the example embodiment, E stands for an EXPAND command. The set of instructions associated with the compression and/or redundancy instructions may be a wire protocol.

In one embodiment, the transmission control module 302 of the redundancy removal engine 104 may select through at least one hash identifier of the plurality of hash identifiers that is generated through the fingerprint module to index the at least one hash identifier based on a sparsity constraint. In one embodiment, the transmission control module 302 of the redundancy removal engine 104 of the network apparatus to transmit the compressed data stream to a second network element 112 communicatively coupled to the first network element 102. In one embodiment, at least one hash identifier of the plurality of hash identifiers that is generated through the fingerprint module 314 to index the at least one hash identifier may be selected through a transmission control module 302 of the redundancy removal engine 104 based on a sparsity constraint 816. In one embodiment, the transmission control module 302 may apply a most significant bit rule of the sparsity constraint to the plurality of hash identifier generated through the fingerprint module 314 to select at least one hash identifier to index. In one embodiment, the at least one hash identifier may be selected when an equivalent value of a threshold number of the most significant bits of the hash identifier of the portion of data of the contiguous data block is determined to be equal to a predetermined value as mentioned in the description FIG. 8. In one embodiment, the transmission control module 302 may reduce the number of hash identifiers that are indexed based on a distance rule of the sparsity constraint. In one embodiment, the hash identifier is indexed based on the distance rule if the portion of data of the contiguous data block represented through the hash identifier may be spaced at least a threshold data size distant from another portion of data of the contiguous data block represented through another hash identifier that is indexed as mentioned in the description FIG. 8. In one embodiment, the number of hash identifiers that are indexed may be reduced to decrease the memory space associated with the first network element consumed through indexing the hash identifiers. In one embodiment, the transmission control module 302 may further generate a hash identifier of a portion of data associated with the data stream 202 received the first network element 102 through a first network connection that communicatively couples the first network element 102 with a source of the data stream 106 based on the identifier constraint. In one embodiment, the identifier constraint may determine the length of portion of data of the data stream of which the hash may be generated. In an example embodiment, the identifier constraint may determine the length of portion of data of the data stream of which the hash may be generated to be 128 Bytes. In one embodiment, the length of portion of data of the data stream of which the hash identifier is generated may be of a fixed length. In one embodiment the length of portion of data of the data stream 202 of which the hash may be generated may be determined by the length of portion of data of the data block 602 represented by the indexed hash identifier.

In one embodiment, the transmission compression module 304 may compare the hash identifier of the portion of the data stream 202 with the indexed hash identifier 822 of the portion of data associated with the contiguous data block 602 stored in the bidirectional cache memory. In one embodiment, the hash identifier of the portion of the data stream 202 with the indexed hash identifier 822 of the portion of data associated and the contiguous data block 602 stored in the bidirectional cache memory may be compared to find a match between the hash identifier of the portion of the data stream 202 and the indexed hash identifier 822 of the portion of data associated with the contiguous data block 602 stored in the bidirectional cache memory.

In one embodiment, when the hash identifier of the portion of the data stream 202 matches the indexed hash identifier 822 of the portion of data associated with the contiguous data block 602 stored in the bidirectional cache memory the transmission control module 302 of the redundancy removal engine 104 may retrieve the contiguous data block 602 that includes the portion of data of the data block 602 associated with the indexed hash identifier that matches with the hash identifier of the portion of data associated with the data stream 202. In one embodiment, the transmission compression module 304 may compare the portion of data of the contiguous data block 602 associated with the indexed hash identifier 822 with the portion of data of the data stream 202 associated with the hash identifier that matches the indexed hash identifier to verify a match between the portion of data of the contiguous data block 602 associated with the indexed hash identifier 822 and the portion of data of the data stream associated with the hash identifier that matches the indexed hash identifier. In one embodiment, the comparison between the portion of data of the contiguous data block 602 associated with the indexed hash identifier 822 with the portion of data of the data stream 202 associated with the hash identifier that matches the indexed hash identifier may be based on the match between the indexed hash identifier that represents the portion of data of the contiguous data block stored in the bidirectional cache and the hash identifier that represents the portion of data of the data stream 202. In the embodiment of FIG. 2, the transmission control module 302 may transmit the compressed data stream 204 of the redundancy removal engine 104 of the first network element 102 to a second network element 112 that may be communicatively coupled to the first network element 102. In one embodiment, the transmission compression module 304 may transmit the compressed data stream 204.

In one embodiment, the receiver decompression module 310 may receive a compressed data stream $204_b$. In an example embodiment of FIG. 2, the receiver decompression module 310 may receive a compressed data stream $204_b$ from the first network element 102. In one embodiment, the receiver decompression module 310 may receive the compressed data stream $204_b$ from a remote peer redundancy removal engine 104 associated with an element from which the compressed data stream $204_b$ may be received. In one embodiment, the decompressed data stream $204_b$ may be a set of compression instructions sent from a remote peer redundancy removal engine 104. In embodiment, the set of instructions may enable to recreate the data stream 202 that was compressed in the remote peer redundancy removal engine prior to transmission. In one embodiment, the receiver decompression module 310 may decompress the compressed data stream based on a set of instructions to recreate the data stream 202. In the embodiment of FIG. 2, the receiver control module 308 may receive the compressed data stream 204 through a second network connection associated with the first network element that communicatively couples the first network element to the second network element from which the compressed data is received. In one embodiment, the receiver decompression module 310 of the redundancy removal engine 104 may reconstruct the compressed data stream that is received.

In one embodiment, the reconstruction may be based on a redundancy instruction that is used replace a maximal matched portion of the data stream to compress the other data stream. In one embodiment, the other compressed data stream may include another set of redundancy instruction. In one embodiment, the receiver control module 308 may decode the instructions to descriptors. In one embodiment, the receiver decompression module may convert the instructions to descriptors. In one embodiment, the receiver control module may process the descriptors that may require data from the data store module 306.

In one embodiment, the data store module 306 may be responsible for bookkeeping of all cached data. In one embodiment, the cached data may be the data block 602 that may be stored in the bidirectional cache memory. In one embodiment, the index of hash identifiers may be stored in the fingerprint module 312. In one embodiment, the data store module 306 may store the data block associated with the pointer identifier. In one embodiment, when the pointer identifier is given the data store module 306 may retrieve the associated data block. In one embodiment, the fingerprint module 312 may have a storage module as well (not shown in Figure). In one embodiment, the data store module may be shared between the receiver control module 308, receiver decompression module 310, the transmission control module 302 and/or the transmission compression module 304 of the redundancy removal engine 104.

In one embodiment, the data store module may be volatile memory. In one embodiment, the data store module may be a non-volatile memory. In one embodiment, the redundancy removal engine 104 may be a hardware embodiment. In on embodiment, redundancy removal engine 104 may be a software embodiment. The software embodiment of redundancy removal engine 104 may be stored in a memory (not shown in FIG. 3) of the network element and may be executed through a processor 316. In one embodiment, the processor may be associated with the network element and/or the redundancy removal engine 104. In one embodiment, all the modules of the redundancy removal engine may be communicatively coupled to the processor 316. In one embodiment, the processor may be a hardware processor. In an example embodiment, the processor 316 may be associated with network element 102 and/or 112.

In one embodiment, the persistent storage 318 may be a volatile and/or a non-volatile memory. In one embodiment, the contiguous data block 602 associated with a pointer identifier may be stored in the persistent storage 318 and/or may be moved to the processor to perform relevant additional operations. In one embodiment, the mapping module 312 may assign a pointer identifier to the contiguous data block 602. In one embodiment, the pointer identifier may identify the contiguous data block 602. In one embodiment, the pointer identifier that identifies the contiguous data block may be associated with the plurality of hash identifiers that represent the different portions of data of the contiguous data block represented by the pointer identifier for which the hash identifier is generated. In one embodiment, each of the plurality of hash identifiers may represent each of a different portion of data of the contiguous data block 602 for which the hash identifier is generated.

Figure 4:
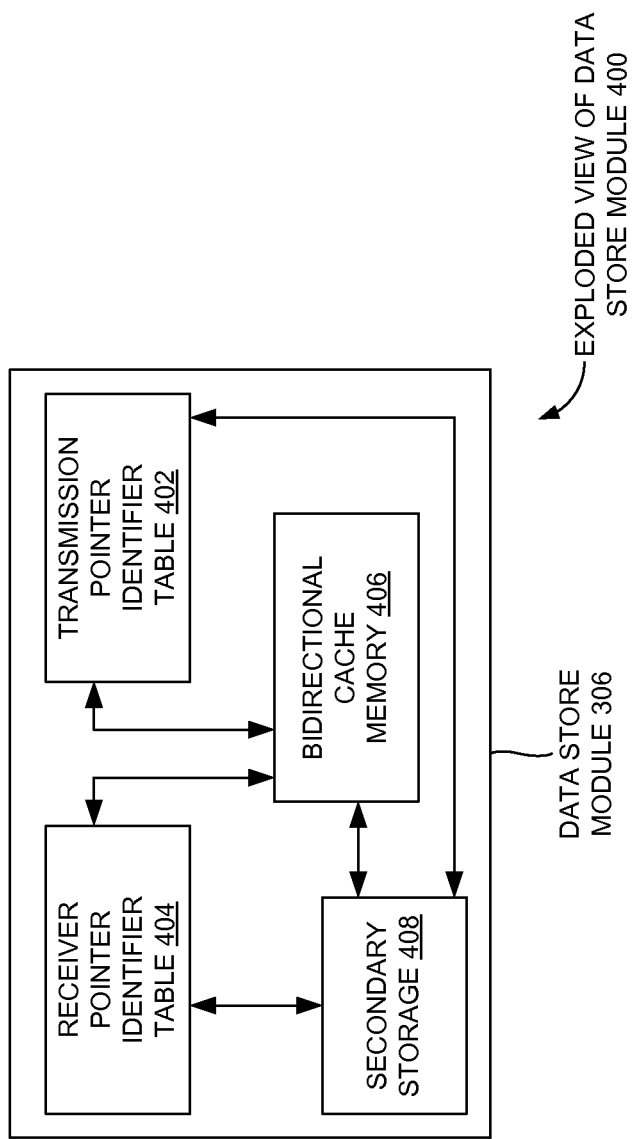
FIG. 4 illustrates an exploded view of the data store module associated with the redundancy removal engine of FIG. 1, according to one or more embodiments.

Now refer to FIG. 4 and FIG. 3. FIG. 4 illustrates an exploded view of the data store module associated with the redundancy removal engine of FIG. 1, according to one or more embodiments. In particular, FIG. 4 illustrates a transmission pointer identifier table 402, receiver pointer identifier table 404, bidirectional cache memory 406 and/or secondary storage module 408.

In one embodiment, the transmission pointer identifier table 402 may be a table which includes all the pointer identifiers associated with the data block 602 stored in the bidirectional cache memory 406. In one embodiment, the bidirectional cache memory 406 may be a physical cache memory and/or virtual cache memory. In one embodiment, the bidirectional cache memory 406 may store a data block associated with the data stream when a contiguous portion of the data stream is identified to have new data based on a comparison of a hash identifier of the data stream with the indexed hash identifiers. In one embodiment, the transmission control module 302 and the receiver control module may access the transmission pointer identifier table 402 and the receiver pointer identifier table respectively to request for a certain data block stored in the bidirectional cache memory. In one embodiment, the control modules may request for a pointer identifier. In one embodiment, if the pointer identifier table responds stating that the requested data block or the pointer identifier of the data block is not available, then the secondary storage module 408 may check for the specific data block in the persistent storage shown in FIG. 3. The persistent storage may return the data block that is being requested for by the control modules, in one embodiment. In one embodiment, the secondary storage module 308 may be a software module and/or a hardware module that is configured to manage the persistent memory based on requests from the pointer identifier tables and/or the bidirectional cache memory 406. Once the data block is retrieved and returned to the bidirectional cache memory 406, the pointer identifier table may be modified to include the pointer identifier associated with the data block that is retrieved from the persistent storage and stored in the bidirectional cache memory. In one embodiment, the bidirectional cache memory 406 may replace the persistent storage. In one embodiment, the size of the bidirectional cache memory may be modified to operate the redundancy removal engine in the absence of the persistent storage.

Figure 9:
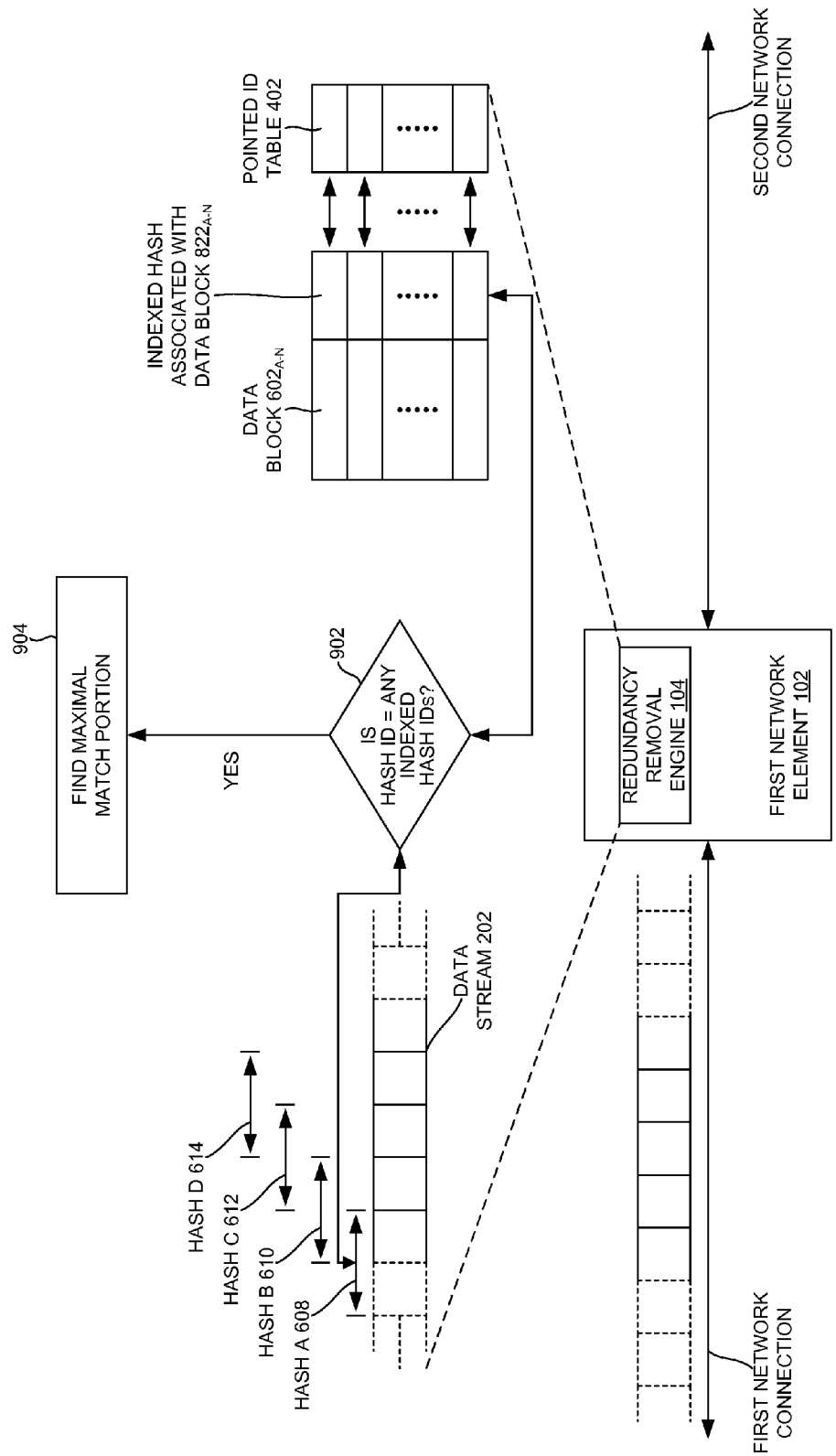
FIG. 9 illustrates a hash comparison to finding a redundant data through the redundancy removal engine, according to one or more embodiments.

Now refer to FIG. 9. FIG. 9 illustrates a hash comparison to finding a redundant data through the redundancy removal engine, according to one or more embodiments. In the embodiment of FIG. 9, the data stream 202 may be received by the first network element 102. In one embodiment, the transmission control module 302 of the redundancy removal engine 104 may receive the data stream 202. In one embodiment the data stream 202 may be an infinite data stream. In one embodiment, the transmission control module 302 of the redundancy removal engine may 104 may generate a hash identifier (hash a 608-hash d 610) of at least one portion of data of the data stream 202. In one embodiment, each hash identifier (hash a 608-hash d 610) of each of the portion of data of the data stream 202 may be compared with an indexed hash identifier of a portion of data associated with the data block 602 stored in the bidirectional cache memory of the redundancy removal engine 104, such as in operation 902. In one embodiment, the hash identifier of the portion of data associated with the data stream may be compared to the indexed hash identifier associated with the data block 602 to find a match between the hash identifiers. In one embodiment, a match between the hash identifier of the data stream and the indexed hash identifier may indicate a redundant portion of data in the data stream 202. In one embodiment, the comparison may be based on a search algorithm. In one embodiment, any search algorithm may be used to find a match between the each hash identifier (hash a 608-hash d 610) of each of the portion of data of the data stream 202 and the indexed hash identifier of a portion of data associated with the data block 602 stored in the bidirectional cache memory of the redundancy removal engine 104.

Figure 10:
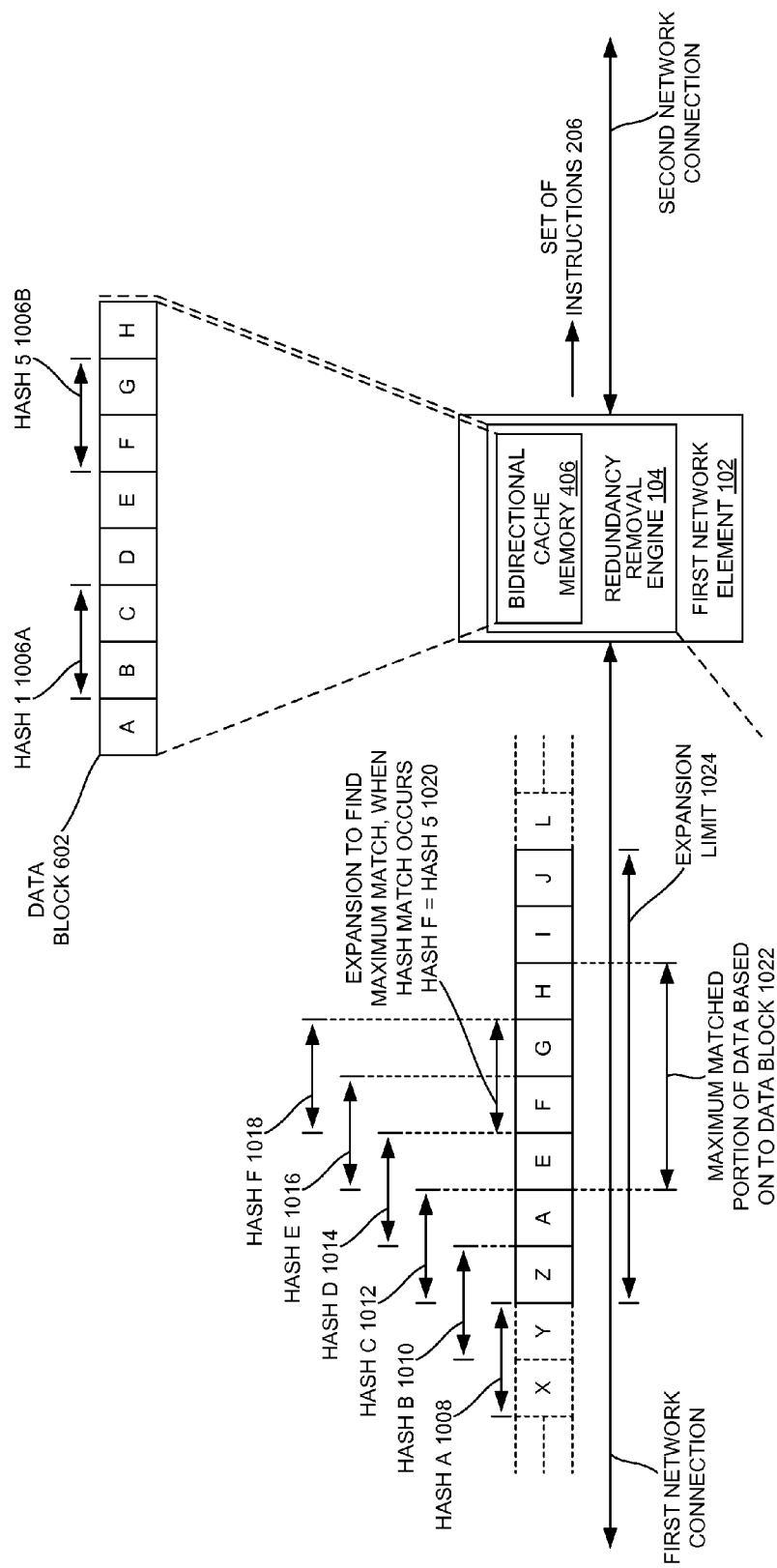
FIG. 10 illustrates and example embodiment of finding a maximal match portion of data of the data stream through the redundancy removal engine of FIG. 1, according to one or more embodiments.

In one embodiment, if one of the hash identifier (hash a 608-hash d 610) of the portion of data of the data stream 202 matches with an indexed hash identifier of a portion of data associated with the data block 602 stored in the bidirectional cache memory 406 of the redundancy removal engine 104, then a search for maximal matched region is performed as in operation 904. In one embodiment, the maximal matched region may be found as illustrated in FIG. 10. In one embodiment, if the hash identifier (hash a 608-hash d 610) of the portion of data of the data stream 202 does not match with an indexed hash identifier of a portion of data associated with the data block 602 stored in the bidirectional cache memory 406 of the redundancy removal engine 104, then the data stream may be replaces by the redundancy instruction. The redundancy instructions that replace the portion of data that is not redundant may indicate that the data is not redundant for purposes of reconstruction of data from the redundant instruction.

Now refer to FIG. 10. FIG. 10 illustrates and example embodiment of finding a maximal match portion of data of the data stream through the redundancy removal engine of FIG.

1, according to one or more embodiments. In the example embodiment of FIG. 10, the hash identifier (1008-1018) associated with the data stream 202 may be compared with the indexed hash indentifier (1006$_a$ and 1006$_b$) associated with the data block 602. In one embodiment, there may be numerous other hash identifiers associated with both the data stream 202 and/or the data block 602. The number of hash identifiers shown in the example embodiment of FIG. 10 is merely for the purposes of explanation and may not be taken as a limitation. In the example embodiment, the data block 602 may include 8 characters "abcdefgh". In the example embodiment, the hash identifier 1 (hash 1 1006$_a$) and hash identifier 5 (hash b 1006$_b$) associated with the data block 602 may be indexed. In one embodiment, the hash identifier 1 may represent a portion of the data block "bc" and/or the hash identifier 5 may represent a portion of the data of the data block "fg".

In the example embodiment, the data stream 202 received by the first network element 102 may be an infinite data stream. In the example embodiment, a portion of the data stream "xyzaefghijl" may be shown. In the example embodiment, hash identifiers (1008-1018) of each portion of data of the data stream may be generated as shown in FIG. 10. In one embodiment, the hash identifiers may be generated through the fingerprint module 314 of the redundancy removal engine 104. In one embodiment, the hash identifier (1008-1018) may be compared with the indexed hash identifiers (1006$_a$ and 1006$_b$) through the transmission compression module 304. In the example embodiment, the portions of data of the data stream 202 represented through hash identifiers hash a-hash e (1008-1016) are "xy", "yz", "za","ae" and "ef" respectively. In the example embodiment, none of the hash identifiers from hash a-hash e match with the indexed hash identifier 1006$_a$ and/or 1006$_b$. However, in the example embodiment, the hash identifier hash f 1018 of the data stream 202 that represents the portion of data "fg" of the data stream may match with the hash identifier 5 (hash 5, 1006$_b$) of the data block 602. In one embodiment, the match may indicate that the portion of data "fg" of the data block may be redundant in the data stream 202.

In one embodiment, when the hash identifier of the portion of data associated with the data stream 202 matches the indexed hash identifier of the portion of data associated with the data block 602, the data block 602 may be retrieved to further compare the data block 602 with the data stream 202. In one embodiment, the match in the hash identifier of the portion of data associated with the data stream 202 and the indexed hash identifier of the portion of data associated with the data block 602 may indicate a match in the portion of data in the data stream 202 and the data block 602. In one embodiment, once the portion of data associated with the data stream 202 matches the portion of data associated with the data block 602 based on a match in the respective hash identifier, the matching portion of data in the data stream may be expanded byte by byte both to the left and the right of the matching portion of data. In one embodiment, the matching portion of data may be considered as redundant data. In one embodiment, the limit of the expansion may be equal to the size of the data block and/or the size of the data stream whichever comes first (e.g., if the data stream may not be infinite). In the example embodiment, the portion of data "fg" in the data block 602 may match a portion of data "fg" of the data stream. In the example embodiment, the matching portion of data "fg" may be expanded to the left and right and further compared with the data block to find a larger matching portion of data with respect to the data block, such as in operation 1020. In the example embodiment, the maximum matching portion of data based on the data block may be "efgh" 1022. In one embodiment, "efgh" may be the maximal redundant data obtained from the redundant data "fg" which is based on the matching of the hash identifiers. In one embodiment, the expansion may further continue till the expansion limit 1024 as shown in FIG. 10. In one embodiment, the limit of expansion 1024 may be based on the size of the data block. In the example embodiment, the data stream 202 may be compared with the indexed hash identifiers 1006$_a$ and/or 1006$_b$ to find the character "fg" and/or "bc" within the data stream 202. When the characters "fg" and/or "bc" represented by hash identifiers hash 1 and hash 5 (1006$_a$ and/or 1006$_b$) are found in the data stream, the data block 602 may be retrieved for further comparison. In one embodiment, in further comparison the matching portion of data may be expanded to find a maximal matching portion of data as shown in FIG. 10.

In one embodiment, the hash identifier of the data stream may be generated till a match is found between the hash identifier of the data stream 202 and the indexed hash identifier. Once the match is found and expansion and/or byte comparison may be performed on the matching portion of data to the expansion limit of size of the data block. The next hash identifier of the data stream may be after an offset of the maximal matched portion of data. In the example embodiment of FIG. 10, after hash identifier f 1018, the next hash identifier may be generated beginning with "ij" which is followed by the maximal matched region is "efgh".

In one embodiment, expanding to matching portion of data to find a maximal redundant data may include expanding the portion of data surrounding the matching portion of data based on the hash identifier match (e.g., "fg" in FIG. 10). In one embodiment, the matching portion of data may be expanded by including surrounding data byte by byte. For example, once "fg" is found to be redundant, "efg" may be compared with the data in the data block to see if there is a match. Then "efgh" may be compared with the data in the data block to see if there is a match and so on. Once the largest matching portion is obtained, the largest matching portion of data may be the maximal matching portion of data. The expansion limit is the size of the data block. In another example embodiment, the maximal matching portion in reference to data block 602 may be "abcdefgh" if the string "abcdefgh" appears in the data stream 202 (not shown in FIG. 11). In one embodiment, the maximal matched portion of data 1022 may be contiguous portion of data in the data stream and/or the data block. In one embodiment, if on expansion and comparison there is no further match, then the matched portion of data that is matched based on the matching hash identifiers may be considered as the maximal matched portion of data. For example "fg" may be the maximal matched portion of data if "efgh" match did not exist in the data stream.

In one embodiment, once the portion of data associated with the data stream 202 matches the portion of data associated with the data block 602 based on a match in the respective hash identifier based on a match in the respective hash identifier the transmission control module 302 of the redundancy removal engine 104 may retrieving the contiguous data block 602 stored in the bidirectional cache memory 406 that includes the portion of data associated with the indexed hash identifier 1006$_b$ of the portion of data of the data block 602 that matches with the hash identifier hash f 1018 of the portion of data associated with the data stream 202. In one embodiment, the transmission compression module 304 may compare the portion of data of the contiguous data block associated with the indexed hash identifier with the portion of data of the data stream associated with the hash identifier that matches the indexed hash identifier (e.g., "fg" in FIG. 10) to verify a match between the portion of data of the contiguous data block associated with the indexed hash identifier and the portion of data of the data stream associated with the hash identifier that matches the indexed hash identifier based on the match between the indexed hash identifier that represents the portion of data of the contiguous data block stored in the bidirectional cache and the hash identifier that represents the portion of data of the data stream.

In one embodiment, the transmission compression module 304 may maximize the portion of data of the data stream that is matched with the portion of data of the contiguous data block stored in the bidirectional cache through a per byte bidirectional expansion of the portion of data of the data stream associated with the hash identifier that matches the indexed hash identifier of the portion of data of the contiguous data block stored in the bidirectional cache and simultaneous comparison of the expanded portion of data of the data stream with the data of the contiguous data block stored in the bidirectional cache associated with the indexed hash identifier that matches the hash identifier of the portion of data of the data stream to find a maximal matching portion of data of the data stream. In one embodiment, the expansion limit is the size of the contiguous data block stored in the bidirectional cache.

Figure 5:
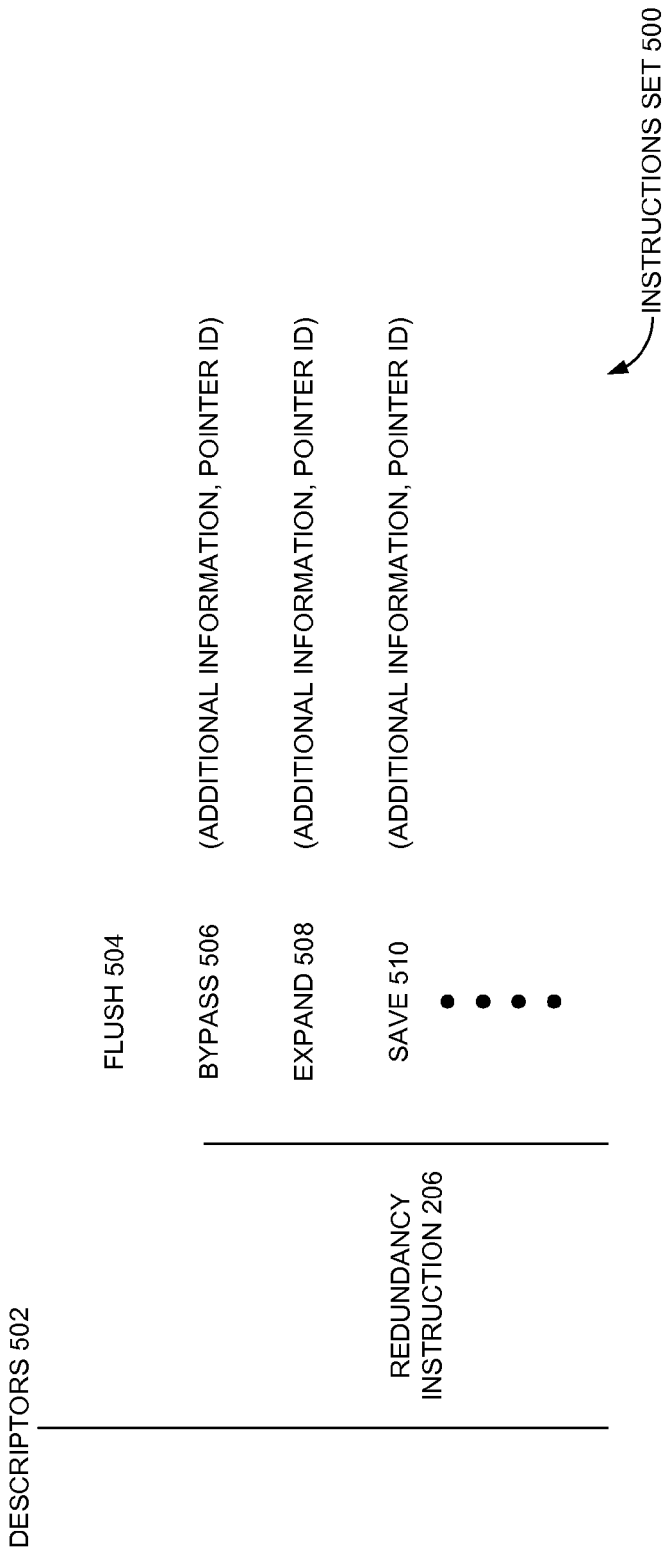
FIG. 5 illustrates a set of redundancy instructions and descriptors associated with the redundancy removal engine of FIG. 1, according to one or more embodiments.

In one embodiment, when the maximal matched portion of data is found a set of redundancy instructions 206 may be generated to replace the maximal matched portion of data. In one embodiment, the set of instructions may replace the portion of the data stream that may be equal to the size of the data block. In one embodiment, the portion of data of the data stream equal to size of the data block in the bidirectional cache memory 406 may include the maximal matched portion of data. In the example embodiment of FIG. 10, in the data stream 202 "xyzaefghijl", the portion of data that may be replaced by the set of redundancy instructions 206 may be "zaefghij" of 8 characters that match the size of the data block 602 of 8 characters in the example embodiment of FIG. 10. The replaced portion of data of the data stream 202 includes the maximal matched portion "efgh" in the example embodiment of FIG. 10. In one embodiment, the set of redundancy instructions may be described in FIG. 5. In one embodiment, if the data stream is "xyzaefghijl", even though 'xy' and '1' falls outside the size of the data block when starting the expansion from the matched portion of 'fg', 'xy' and '1' may not be left out. The characters 'xy' and '1' in this case may be transmitted through a BYPASS instruction if the portions 'xy' and '1' don't match with a portion of data of the data block stored in the bidirectional cache memory 406 as illustrated in FIG. 5. In some embodiments, the data blocks may be nearly simultaneously stored in the bidirectional cache memory and the persistent storage.

Now refer to FIG. 5. FIG. 5 illustrates a set of redundancy instructions and descriptors associated with the redundancy removal engine of FIG. 1, according to one or more embodiments. In one embodiment, the redundancy removal engine 104 may have more than the listed set of instructions 500 illustrated in FIG. 5. In one embodiment, the set of redundancy instructions 206 illustrated in FIG. 5 may communicated between a transmission compression module 304 of a redundancy removal engine associated with the first network element 102 and a receiver decompression module 310 of a remote redundancy removal engine 104 associated with a remote network element. In one embodiment the remote network element may be a destination network element 116 and/or the second network element 112. In one embodiment, the set of redundancy instructions 206 may replace a portion of data of the data stream that includes a maximal matched portion of data. The length of the portion of data of the data stream that is replaced may be equal to the size of the data block associated with the indexed hash identifier that matches the hash identifier of the portion of data associated with the data stream. In one embodiment, the data size of the set of redundancy instructions that replaces the portion of the data of data of the data stream (e.g., that includes the maximal matched portion of data) equivalent to the size of the corresponding data block may be smaller than the size of data block.

In one embodiment, transmitting the set of redundancy instructions that replaces the portion of the data of data of the data stream (e.g., that includes the maximal matched portion of data) equivalent to the size of the corresponding data block may be more bandwidth efficient rather than transmitting the raw data. In one embodiment, the portion of the data of data of the data stream (that includes the maximal matched portion of data) equivalent to the size of the corresponding data block may include a portion of data different from the maximal matched portion of data along with the maximal matched portion of data. The raw data may be data without any form of compression. In one embodiment, the set of redundancy instructions may be a set of commands to a receiver of the set of redundancy instructions as to how the receiver may reconstruct the original data and/or what the receiver may do with the data that is embedded in at least one of the set of redundancy instruction 206.

In one embodiment, the descriptor 502 may be a super set of instructions that include the redundancy instructions 206 and other internal instructions of the redundancy removal engine issued between the transmission control module 302 and the data store module 306. In one embodiment, the FLUSH instruction 504 may request the data store module 306 to flush the data out for transmission. In an example embodiment, when a communication session is about to get over the transmission control module 302 may issue a FLUSH instruction 504 for the data store module 306 requesting the data store module 306 to flush out the data and not hold data for further compression. In one embodiment, FLUSH instruction 504 instructs to flush all data after certain threshold of time and not to wait for more data for compression. In one embodiment, there may be other descriptor instructions that may be internally used in the redundancy removal engine 104.

In one embodiment, the BYPASS redundancy instruction 506 may request the redundancy removal engine to apply data compression to a given chunk of data. In an example embodiment, the compression applied to the data may be gzip compression. In one embodiment, the parameters of the BYPASS redundancy instruction may be the length of a data and the associated data that is in compressed format. In another embodiment, the parameters of the BYPASS redundancy instruction may be the length of a data, the associated data that is in compressed format and the length of the compressed data. In an example embodiment, if the data is "abcdefgh", the compressed format may be "xyz". In the example embodiment, the BYPASS instruction 504 issued may be BYPASS (8, "xyz"). In another example embodiment, the BYPASS instruction 504 issued may be BYPASS (8, 'xyz', 3). In one embodiment, the receiver module (e.g., receiver decompression module) of the redundancy removal engine 104 may receive a BYPASS instruction 504 and understand that the data is compressed. The compression format used in the redundancy removal engine and the remote peer redundancy removal engine may be synchronized. In one embodiment, the data that is compressed may be expanded and bypassed to obtain the next instruction. In one embodiment, the portion of data of data stream that is compressed and included in the redundancy instructions may be different from the compressed data stream. In one embodiment, the compressed data stream may be a set of redundancy instructions that replace portions of data of the data stream that includes portions of data of the data stream that are redundant and portions of data that are not redundant that are adjacent to the portion of data that are redundant.

In one embodiment, the SAVE redundancy instruction 510 may instruct the redundancy removal engine 104 to locally save the data included in the argument of the SAVE instruction. In one embodiment, save instruction may be used to build data. In one embodiment, the data may be built through appending data to each other through the SAVE instruction 510. In one embodiment, the SAVE instruction 510 may be used to synchronize the data stored in the data store module 306 between different redundancy removal engines between which a data may be sent. In an example embodiment, if first set of data sent is "abcd", then the corresponding SAVE instruction may be SAVE (10, 0, "abcd"). In one embodiment, the argument (e.g., parameter associated with the instruction) '10' may be the pointer identifier associated with the data block that may be locally saved in the bidirectional cache memory 406. In one embodiment, the argument '0' may indicate an offset of data. In one embodiment, argument "abcd" is the data to be saved. In one embodiment, the data to be saved may be in a compressed form. In another embodiment, the data to be saved may not be in a compressed form. In the example embodiment, if another SAVE is issued with SAVE (10, 4, "efg"), then the redundancy removal engine 104 may append "efg" to the previous data "abcd" starting after an offset of 4 characters, according to an example embodiment. The data block pointer identifiers are the same in both SAVE instructions of the example embodiment.

In one embodiment, the EXPAND redundancy instruction 508 may be the instruction that achieves the compression. In one embodiment, the EXPAND instruction 508 may replace the maximal matched portion of data. The EXPAND instruction 508 may be of a smaller data size as compared to the maximally matched portion of data and thus achieves compression of data stream. In one embodiment, the parameters of EXPAND instruction are offset of data in the data block, the pointer identifier and the length of the maximal matched portion of data. In one embodiment, the maximal matched portion of data may be equal to and/or less than the size of the data block associated with the maximal matched portion of data. An example embodiment of the set of redundancy instructions may be illustrated in FIG. 11.

Figure 11:
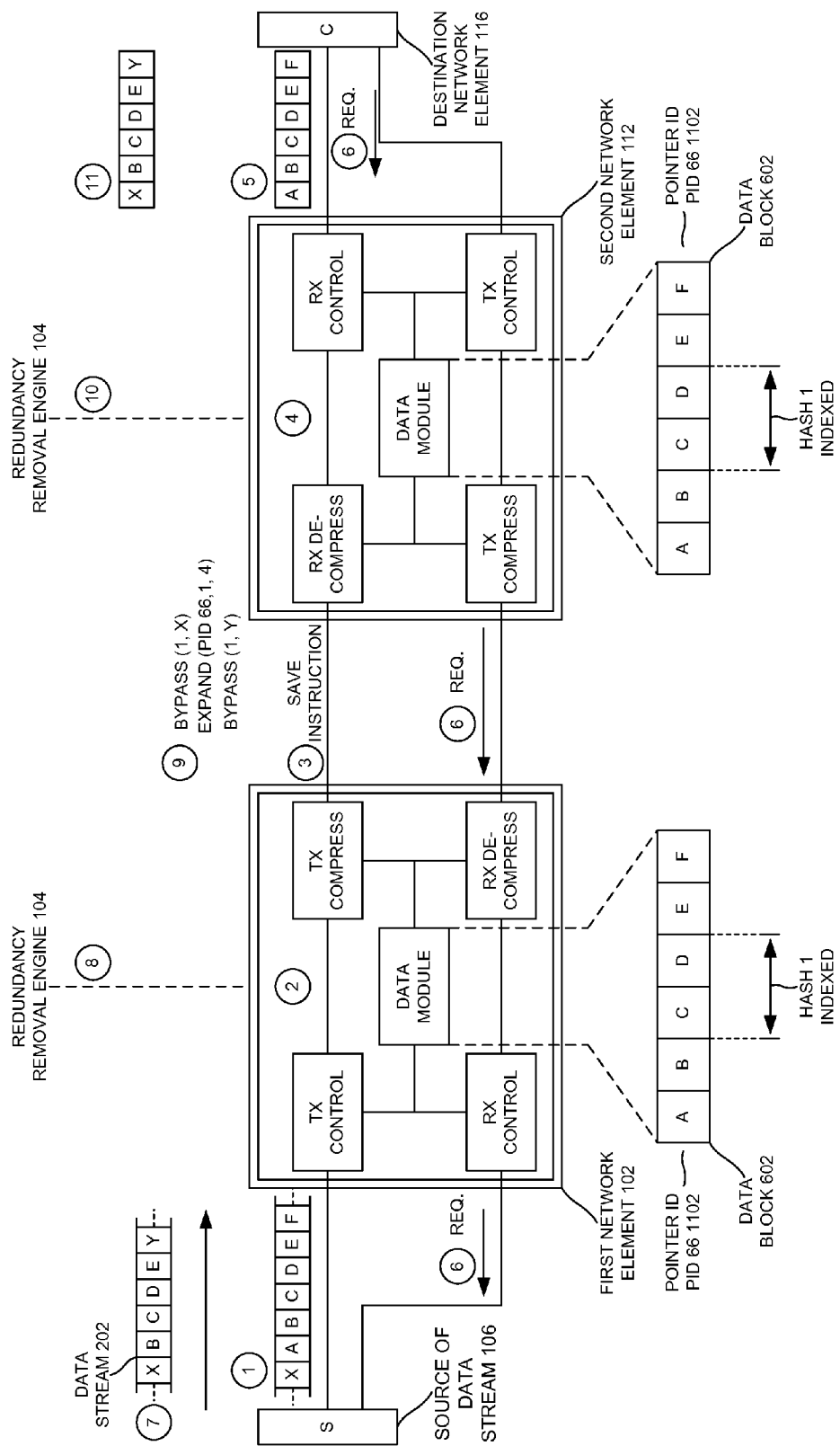
FIG. 11 illustrates a data de-duplication process through the redundancy removal engine 104 in a data de-duplication network of FIG. 1, according to one or more embodiments.

Now refer to FIG. 11. FIG. 11 illustrates a data-deduplication process through the redundancy removal engine 104 in a data-deduplication network of FIG. 1, according to one or more embodiments. In the embodiment of FIG. 11, the server S may be a source of a data stream 106. In one embodiment, the source of the data stream 106 may be a client device. In the embodiment of FIG. 11, the client C may be destination network element 116. In one embodiment, the first network element 102 may be communicatively coupled to the second network element 112 through a second network connection 110. In one embodiment, the first network element 102 may be communicatively coupled to the server (e.g., source of data stream 106) through the first network connection 106. In one embodiment a data stream 202 may be compressed. The compressed data stream 204 may be a set of redundancy instructions. The redundancy instructions may include portions of data of the data stream (in compressed or original format) that have been compressed through replacing the data stream with the set of redundancy instructions.

In the embodiment of FIG. 11, the server (e.g., source of data stream) 106 may initiate a communication with the client (e.g., destination network element) 116. In operation 1, the server S may send a data stream 202 to the client C. In one embodiment, the data stream 202 may be received by the transmission control module 302 of the redundancy removal engine 104 associated with the first network element 102. In the example embodiment of FIG. 11, the data stream that is sent to the client may be " . . . xabcdef . . . ". The data stream 202 may be an infinite data stream 202. The data stream shown in FIG. 11 may be for purposes of description.

In one embodiment, the transmission control module may identify the contiguous data block of a threshold size associated with data stream to have a new data, such as in operation 2. In one embodiment, storing the contiguous data block having new data nearly simultaneously in at least one of the bidirectional cache memory and a persistent storage device of the data store module. In the example embodiment of FIG. 11, the transmission storage module may analyze " . . . xabcdef . . . " and based on a size of the bidirectional cache memory 406 a contiguous block of data of the data stream of threshold size may be determined to have new data. In the example embodiment of FIG. 11, "abcdef" may be the contiguous block of data of threshold data size. In the example embodiment of FIG. 11, the transmission control module 302 may determine the contiguous block of data of the data stream "abcdef" to be new and may be stored in the bidirectional cache memory 406 as a data block. In the example embodiment of FIG. 11, the mapping module of the redundancy removal engine 104 associated with the first network element 102 may assign a pointer identifier 1102 to the contiguous data block 602 "abcdef". In the example embodiment of FIG. 11, the pointer identifier 1102 (e.g., pid 66) may identify the contiguous data block "abcdef".

In one embodiment, when the contiguous block of data of the data stream 202 is determined to be new and if the bidirectional cache memory 406 may be full, an existing contiguous data block in the bidirectional cache memory may be replaced with the contiguous data block having new data based on a first in first out policy. In one embodiment, the existing contiguous data block that is replaced may be stored in the persistent storage device.

In one embodiment, in operation 2 the fingerprint module 314 of the redundancy removal engine 104 may generating a hash identifier of at least one portion of data of a contiguous data block stored in a bidirectional cache memory 406 (not shown in FIG. 11) based on an identifier constraint. In one embodiment, the size of contiguous data block is larger than the size of the at least one portion of data of the contiguous data block for which the hash identifier is generated. In one embodiment, each contiguous data block to have a plurality of hash identifiers.

In one embodiment, in operation 2 the transmission control module 302 of the redundancy removal engine 104 may select at least one hash identifier of the plurality of hash identifiers that is generated through the fingerprint module to index the at least one hash identifier based on a sparsity constraint. In the example embodiment of FIG. 11, the hash identifier that is selected to be indexed is hash 1 that represents a portion of data "cd" of the data block 602 (e.g., "abcdef").

In one embodiment, the pointer identifier that identifies the contiguous data block may be associated with a number of hash identifiers that represent the different portions of data of the contiguous data block represented by the pointer identifier for which the hash identifier is generated. In one embodiment, each of the number of hash identifiers may represent each of a different portion of data of the contiguous data block 602 for which the hash identifier is generated.

In one embodiment, in operation 2 the transmission control module 304 and/or the transmission compression module 304 may issue a SAVE instruction. In an example embodiment of FIG. 11, the SAVE instruction may be of the form SAVE(66, 0, 4, "gydl"). In one embodiment, the arguments of the SAVE instruction may be an offset '0', the pointer id '66', a length of compressed data "4" and/or the compressed form of data "abcdef" represented by "gydl". In one embodiment, the data may be sent without compression. In one embodiment, the compression scheme used may be inter alia, gzip. In one embodiment, the length of both the compressed data and the original data may be sent with the SAVE instruction.

In the embodiment of FIG. 11, in operation 3 the SAVE instruction may be transmitted to the client C through the second network element 112. In one embodiment, the SAVE instruction may be transmitted over the second network connection 110 that communicatively couples the first network element 102 to the second network element 112. In one embodiment, in operation 4, the receiver decompression module 310 of the second network element 112 may receive the SAVE instruction. In one embodiment, the receiver decompression module may decode the SAVE instruction and forward the SAVE instruction to the receiver control module 308. In one embodiment, the receiver control module 308 may communicate with the data store module 306 to store the data "abcdef" in the bidirectional cache memory 406 associated with the second network element 112. In one embodiment, the data may be stored in the bidirectional cache memory 406 of the second network element 112 as a data block with pointer identifier 66. In one embodiment, this operation may synchronize the content of the bidirectional cache memory 406 in both the first network element 102 and the second network element 112. In one embodiment, in operation 4 once the data block is stored in the bidirectional cache memory 406 the transmission control module 302 and/or the transmission compression module 304 may generate a hash identifier of a portion of data of the data block stored in the bidirectional cache memory 406. In one embodiment, the hash identifier algorithm and/or the sparsity constraint in both the first network element 102 and the second network element 112 may be the same. In one embodiment, the hash identifier of the portion of the data of the data block that is indexed in the first network element 102 and the second network element 112 may be the same since the hash identifier algorithm and/or the sparsity constraint applied on the data block and hash identifiers associated with the data block are the same. In one embodiment, the second network element may index hash 1 identifier that represents the portion of data "cd" of the data block 602 "abcdef" stored in the bidirectional cache memory associated with second network element 112.

In one embodiment, in operation 5 once the data block is saved in the bidirectional cache memory 406 of the second network element, the receiver control module 308 may forward the data "abcdef" to the client C (e.g., destination network element 116).

In one embodiment, in operation 6 the client C may send a request to the server S for a data. The data requested may be file, an application etc. In one embodiment, the data may be sent from the server as a data stream. In one embodiment, in operation 5 the request may be transmitted to the server through the first network element 102 and/or the second network element 112. In one embodiment, the request may be sent to the server through an alternate network connection. In one embodiment, the each network connection may have multiple TCP connections over which data may be transmitted.

In one embodiment, once the server receives the request for a data from the client, the server S may send the data as a data stream. In the embodiment of FIG. 11, the server S may send a data " . . . xbcdey . . . " to the client such as in operation 7. In one embodiment, " . . . xbcdey . . . " may be the requested data. In the embodiment of FIG. 11, in operation 8 the transmission control module 302 of the redundancy removal engine 104 may receive the data " . . . xbcdey . . . ". In the example embodiment of FIG. 11, in operation 8 the transmission control module 302 may generate a hash identifier of a portion of data of the data stream 202.

In one embodiment, in operation 8, contiguous portions of data of the data stream may be analyzed for new data. In one embodiment, if new data may be found, the contiguous portion of data of the data stream may be stored as data blocks in the bidirectional cache memory. In one embodiment, generating the hash identifier of the portion of data of the data stream and analyzing the contiguous portions of data of the data stream for new data may occur nearly simultaneously. In one embodiment, generating the hash identifier of the portion of data of the data stream and analyzing the contiguous portions of data of the data stream for new data may occur at different instances. In an example embodiment of FIG. 11, a hash identifier of a portion of data associated with the data stream 202 " . . . xbcdey . . . " received at the data store module of the first network element through a first network connection that communicatively couples the first network element with a source of the data stream based on the identifier constraint. In one embodiment, the length and/or size of the portion of data for which the hash is generated may be determined based on the identifier constraint. In one embodiment, the hash identifier of the portion of data associated with the data stream may be compared with the indexed hash identifier of the portion of data associated with the contiguous data block stored in the cache to find a match. In the example embodiment of FIG. 11, when the hash identifier of the portion of data associated with the data stream 202 (e.g., " . . . xbcdey . . . ") is compared with the indexed hash identifier (e.g., hash 1) of the portion of data (e.g., "cd") associated with the contiguous data block stored in the bidirectional cache memory, a match may be found. In the example embodiment of FIG. 11, the hash identifiers representing the portion of data "cd" of the data stream may be matched with hash 1 of the contiguous data block 602 since hash 1 represents the portion of data "cd" in the contiguous data block. In the example embodiment of FIG. 11, when the hash identifiers representing the portion of data "cd" of the data stream may be matched with hash 1 of the contiguous data block 602, the contiguous data block stored 602 in the bidirectional cache memory 406 (represented by pointer identifier pid 66 1102) comprising the portion of data associated with the indexed hash identifier of the portion of data of the data block that matches with the hash identifier of the portion of data associated with the data stream may be retrieved through a transmission control module of the redundancy removal engine 104. In the example embodiment of FIG. 11, the portion of data (e.g., "cd") of the contiguous data block 602 associated with the indexed hash identifier (e.g., hash 1) may be compared with the portion of data (e.g., "cd") of the data stream 202 (e.g., " . . . xbcdey . . . ") associated with the hash identifier that matches the indexed hash identifier (e.g., hash 1) to verify a match between the portion of data of the contiguous data block associated with the indexed hash identifier and the portion of data of the data stream associated with the hash identifier that matches the indexed hash identifier based on the match between the indexed hash identifier that represents the portion of data of the contiguous data block stored in the bidirectional cache and the hash identifier that represents the portion of data of the data stream. In the example embodiment of FIG. 11, the portion of data (e.g., "cd") of the data stream that is matched with the portion of data of the contiguous data block stored in the bidirectional cache memory 406 may be maximized through a per byte bidirectional expansion of the portion of data of the data stream associated with the hash identifier that matches the indexed hash identifier of the portion of data of the contiguous data block stored in the bidirectional cache. The per byte bidirectional expansion may be described in FIG. 10. In one embodiment, the bidirectional expansion may be nearly simultaneously expanded to the portion of data surrounding the portion of data "cd" that is matched.

In one embodiment, the expanded portion of data of the data stream may be nearly simultaneous compared of with the data of the contiguous data block stored in the bidirectional cache associated with the indexed hash identifier that matches the hash identifier of the portion of data of the data stream to find a maximal matching portion of data of the data stream associated with the data block represented by the matching indexed hash. In one embodiment, the expansion limit may be the size of the contiguous data block stored in the bidirectional cache.

In the example embodiment of FIG. 11, the maximal matching portion of data of the data stream when compared to the data of the data block may be "bcde". In one embodiment, when the maximal portion of data of the data block may be found, the maximal matched portion of data "bcde" of the data stream may be replaced with a redundancy instruction comprising an additional information and the pointer identifier that identifies the contiguous data block stored in the bidirectional cache that is associated with the maximal matched portion of data of the data stream to compress the data stream that is transmitted from the first network element. In one embodiment, the redundancy instruction may enable a reconstruction of the compressed portion of the data stream. In one embodiment, the data size of the redundancy instruction along with the additional information and the indexed hash identifier comprised in the redundancy instruction may be smaller than the size of the maximal matched portion of data of the data stream that is replaced with the redundancy instruction.

In the example embodiment of FIG. 11, in operation 9 a portion of data of the data stream including the maximal matched portion may be replaced by redundancy instructions to compress the portion of data of the data stream as follows:
a) In one embodiment, a bypass instruction may be issued to bypass the byte of data surrounding the maximal matched portion of data. In one embodiment, the portion of data of the data stream that may be replaced may be equivalent to the size of the data block. In one embodiment, the portion of data of the data stream that is equivalent to the size of the data block that may be replaced with the redundancy instructions may include the maximal matched portion of data.
b) In one embodiment, an expand instruction may be issued to replace the maximal matched portion of data included in the portion of data of data stream that is compressed through replacing the portion of data of the data stream with the redundancy instructions.

In one embodiment, the portion of data of the data stream that is replaced by the redundancy instruction to compress the portion of data may include the maximal matched portion of data and a portion of data of the data stream surrounding the maximal matched portion of data of the data stream. In one embodiment, the portion of data of the data stream replaced by the redundancy instruction may be equivalent to the size of the data block stored in the bidirectional cache associated with the indexed hash identifier that matches the hash identifier of the portion of data of the data stream.

In the example embodiment of FIG. 11, in operation 9 the portion of data of the data stream "xbcdey" that is equivalent to the data size of the data block "abcdef", that includes the maximal matched portion "bcde" may be replaced by the following example redundancy instruction set:
BYPASS (1, "x")
EXPAND (pid66, 1, 4)
BYPASS (1, "y")

In one example embodiment, the order of the instructions may be varied. In one embodiment, the order may pertain to the order of reconstruction. In the example embodiment of FIG. 11, the redundancy instruction set shown above may be transmitted to the remote peer redundancy removal engine 104 associated with the second network element. In one embodiment, the redundancy instruction set may be sent to the destination network element (e.g., Client C) provided the destination network element comprised a redundancy removal engine 104.

In one embodiment, network elements that include the redundancy removal engines may be placed at both ends of a bandwidth constrained channel (e.g., first, second and/or third network connection). In one embodiment, the channel may be an access link, wireless link, end to end network path between a proxy and a server and/or a server and a client. In one embodiment, each of the redundancy removal engines may replace repeated strings of a data stream with redundancy instructions that are smaller in data size and/or forward them to the other end of the channel where they may be reconstructed through the redundancy removal engine that received the redundancy instructions on the other end of the channel.

In the example embodiment of FIG. 11, in operation 10 the receiver decompression module 310 of the redundancy removal engine 104 associated with the second network element may receive the redundancy instruction set:
BYPASS (1, "x")
EXPAND (pid66, 1, 4)
BYPASS (1, "y") that may be transmitted from the redundancy removal engine associated with the first network element. In the example embodiment of FIG. 11, the redundancy removal engine associated with the second network element 112 may be considered the remote peer redundancy removal engine with respect to the redundancy removal engine associated with the first network element 102. In one embodiment, the receiver decompression module may reconstruct the data stream based on the redundancy instruction set received from the redundancy removal engine associated with the first network element 102. In one embodiment, the redundancy instructions may be forwarded to the receiver control module 308.

In one embodiment, the receiver control module 308 may reconstruct the data stream based on the redundancy instruction set, such as in operation 10. In one embodiment, the BYPASS (1, "x") instruction may inform the redundancy removal engine to bypass the 1 byte of data "x". In one embodiment, the first byte of the data "x" may be reconstructed based on the BYPASS instruction. In one embodiment, the next 4 byte of the data stream may be reconstructed based on the EXPAND instruction. EXPAND (pid66, 1, 4) may instruct the redundancy removal engine associated with the second network element 112 to reconstruct the next 4 bytes after an offset of 1 byte. In one embodiment, the 4 characters may be reconstructed from the data block pid66 stored in the bidirectional cache memory 406 of the second network element 112. The four character used to reconstruct the data stream may be chosen after an offset of 1 character "a" of "abcdef". In one embodiment, the four characters that may be appended to "x" which was reconstructed based on the BYPASS instruction may be "bcde". In one embodiment, the BYPASS (1,"y") may append 1 byte of data which is "y" to the "xbcde" which has been reconstructed through the BYPASS (1, x) and the EXPAND instructions. In one embodiment, the reconstructed portion of data may be "xbcdey". In one embodiment, the reconstructed portion of data "xbcdey" of the data stream may be forwarded to the client C (e.g., destination network element 116), in operation 11.

In one embodiment, the redundancy removal engine of the first network element (e.g., sender) may issue the redundancy instructions (e.g., SAVE or EXPAND) without confirming with the redundancy removal engine of the second network element (e.g., remote peer (receiver)) that the space (for SAVE) and/or the data (for EXPAND) are available at the redundancy removal engine of the second network element (e.g., remote peer (receiver)) to communicate through a non N-phase commit. In one embodiment, when the remote peer (e.g., the redundancy removal engine of the second network element including) receives the SAVE instruction and/or the EXPAND instruction, the remote peer may send a response to the sender to acknowledge if the instructions have been received and/or the content received is corrupt. In one embodiment, the response may be sent in the form of data packets. In one embodiment, the response packet may be an ACK packet and/or a NAK packet. ACK may stand for acknowledgement.

Figure 11A:
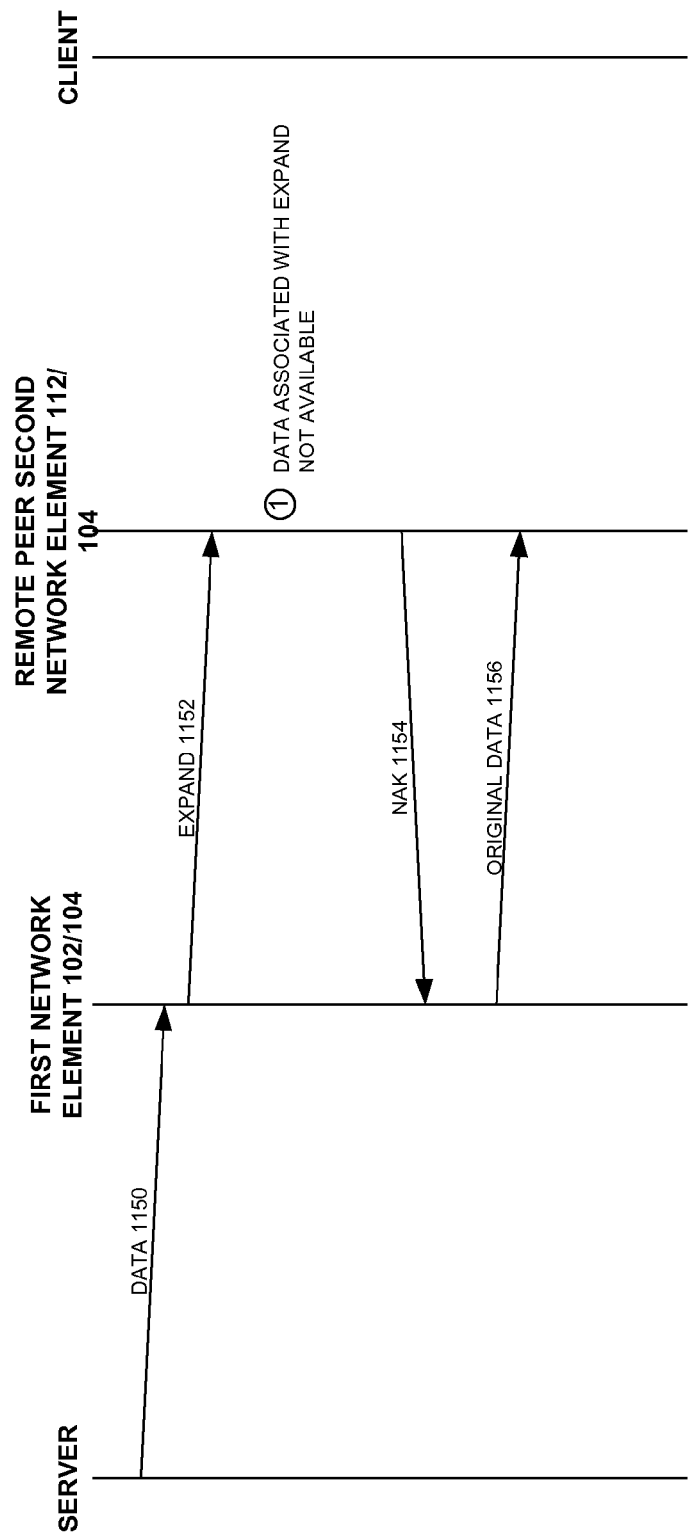
FIG. 11A illustrates a response to an EXPAND instruction when the remote peer does not have the corresponding data, according to one or more embodiments.

FIG. 11A illustrates a response to an EXPAND instruction when the remote peer does not have the corresponding data, according to one or more embodiments. In one embodiment, when the redundancy removal engine 104 of first network element 102 sends an EXPAND instruction to the redundancy removal engine 104 of the second network element 112, the redundancy removal engine of the second network element 112 that receives the EXPAND instruction may be considered as remote peer. In another embodiment, the redundancy removal engine of the first network element 102 may be remote peer to the redundancy removal engine of second network element 112 and vice-versa.

In one embodiment, the remote peer may send an ACK in response to receiving a data packet (e.g., instruction such as SAVE or EXPAND) if the remote peer received the content, the content is not corrupt and/or the redundancy removal engine in the first network element (e.g., element that sent the data) and the redundancy removal engine of the second network element (e.g., remote peer (receiver)) are synchronized. In one embodiment, the redundancy removal engine in the first network element (e.g., element that sent the data) and the redundancy removal engine of the second network element (e.g., remote peer (receiver)) are synchronized if the bidirectional cache memory and/or persistent storage of both the redundancy removal engine in the first network element (e.g., element that sent the data) and the redundancy removal engine of the second network element (e.g., remote peer (receiver)) have the same content (e.g., data block in the bidirectional cache memory and/or persistent storage) and/or are in the same state (e.g., space in the bidirectional cache memory and/or persistent storage).

In one embodiment, in operation 1150, the server may send a data to the client through the first network element and/or second network element that include the redundancy removal engine. In one embodiment, in operation 1152 the redundancy removal engine of the first network element 102 may receive the data and process the data to compress it. In one embodiment, in operation 1152 the redundancy removal engine of the first network element 102 may issue an EXPAND instruction that may be transmitted to the redundancy removal engine of the second network element 112. In one embodiment, if the bidirectional cache memory and/or persistent storage of both the redundancy removal engine in the first network element (e.g., element that sent the data) and the redundancy removal engine of the second network element (e.g., remote peer (receiver)) do not have the same content, when an EXPAND command is issued by the redundancy removal engine of first network element, the redundancy removal engine of the second network element (e.g., remote peer (receiver)) may not have the data block and may not be able to execute the EXPAND instruction. In one embodiment, in operation 1154 when the redundancy removal engine of the second network element (e.g., remote peer (receiver)) may not be able to execute the EXPAND instruction (e.g., since the data block associated with the EXPAND is not present in the bidirectional cache memory and/or the persistent storage of the remote peer), the remote peer may issue a NAK packet back to the redundancy removal engine of first network element. In one embodiment, in operation 1156 when the redundancy removal engine of the first network element receives a NAK in response to an EXPAND instruction, the redundancy removal engine of the first network element may transmit (e.g., re-transmit) the original data (e.g., uncompressed data) associated with the EXPAND instruction that received a NAK in response and/or delete the data block associated with the EXPAND instruction that received the NAK in response to synchronize state of the bidirectional cache memory and/or persistent storage of the redundancy removal engine in the first network element (e.g., element that sent the data) and the redundancy removal engine of the second network element (e.g., remote peer (receiver)).

Figure 11B:
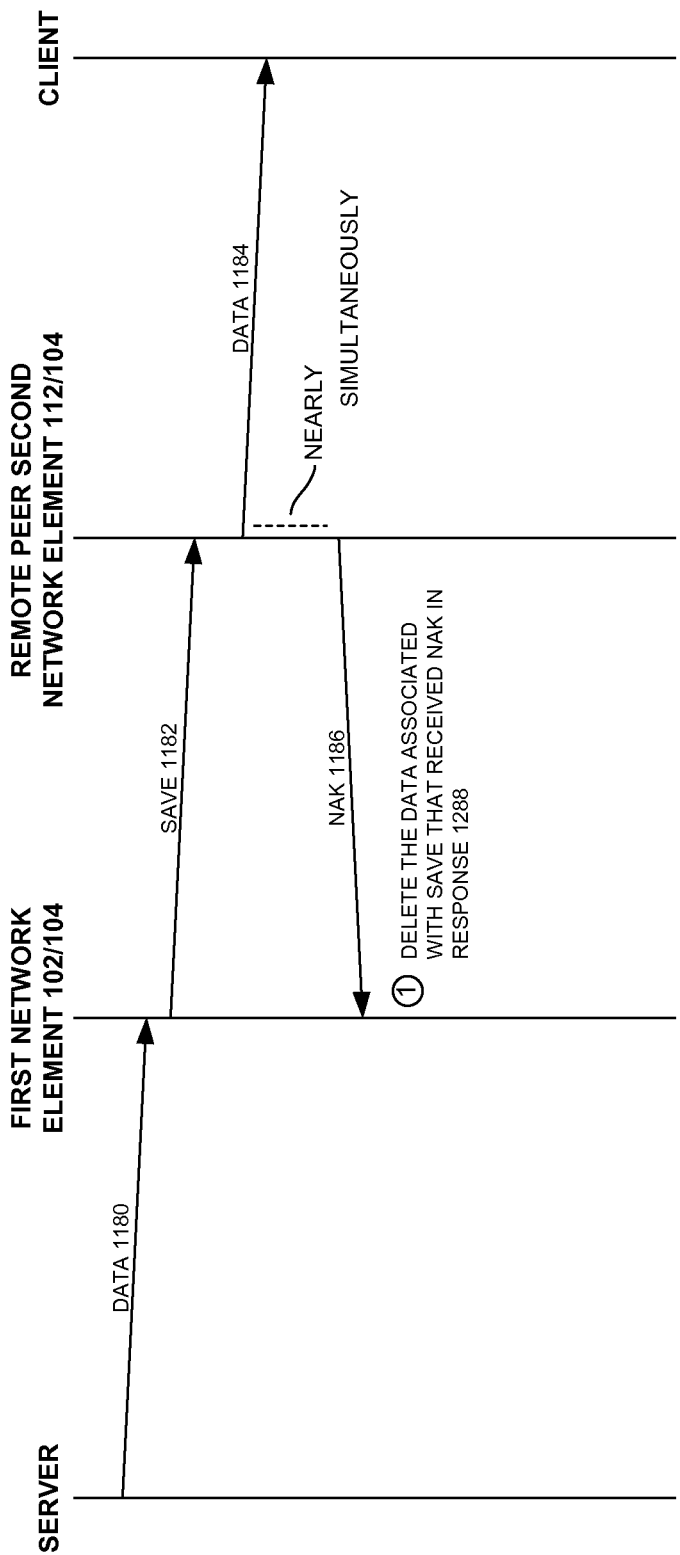
FIG. 11B illustrates a response to a SAVE instruction when the remote peer does not have storage space, according to one or more embodiments.

FIG. 11B illustrates a response to a SAVE instruction when the remote peer does not have storage space, according to one or more embodiments. In one embodiment, in operation 1180, the server may send a data to the client through the first network element and/or second network element that include the redundancy removal engine. In one embodiment, in operation 1182 the redundancy removal engine of the first network element 102 may receive the data and process the data to compress it. In one embodiment, in operation 1182 the redundancy removal engine of the first network element 102 may issue an SAVE instruction that may be transmitted to the redundancy removal engine of the second network element 112.

In one embodiment, if the bidirectional cache memory and/or persistent storage of both the redundancy removal engine in the first network element (e.g., element that sent the data) and the redundancy removal engine of the second network element (e.g., remote peer (receiver)) are not in the same state (space in the memory), when a SAVE command is issued by the redundancy removal engine of first network element, the redundancy removal engine of the second network element (e.g., remote peer (receiver)) may not have space to store the data block and may not be able to execute the SAVE instruction to save the data. In one embodiment, however, the redundancy removal engine of the second network element (e.g., remote peer (receiver)) may process the data associated with the SAVE instruction and forward the data block and/or data associated with the SAVE instruction to the next network element (e.g., destination network element) in operation 1184. In one embodiment, in operation 1186 nearly simultaneously the remote peer may issue a NAK packet to be transmitted to the redundancy removal engine of the first network element in response to the SAVE instruction that was not executed to save the data. In one embodiment, in operation 1188 the redundancy removal engine of the first network element may delete the data block associated with the SAVE instruction that received a NAK in response to synchronize state of the bidirectional cache memory and/or persistent storage of the redundancy removal engine in the first network element (e.g., element that sent the data) and the redundancy removal engine of the second network element (e.g., remote peer (receiver)).

Figure 12:
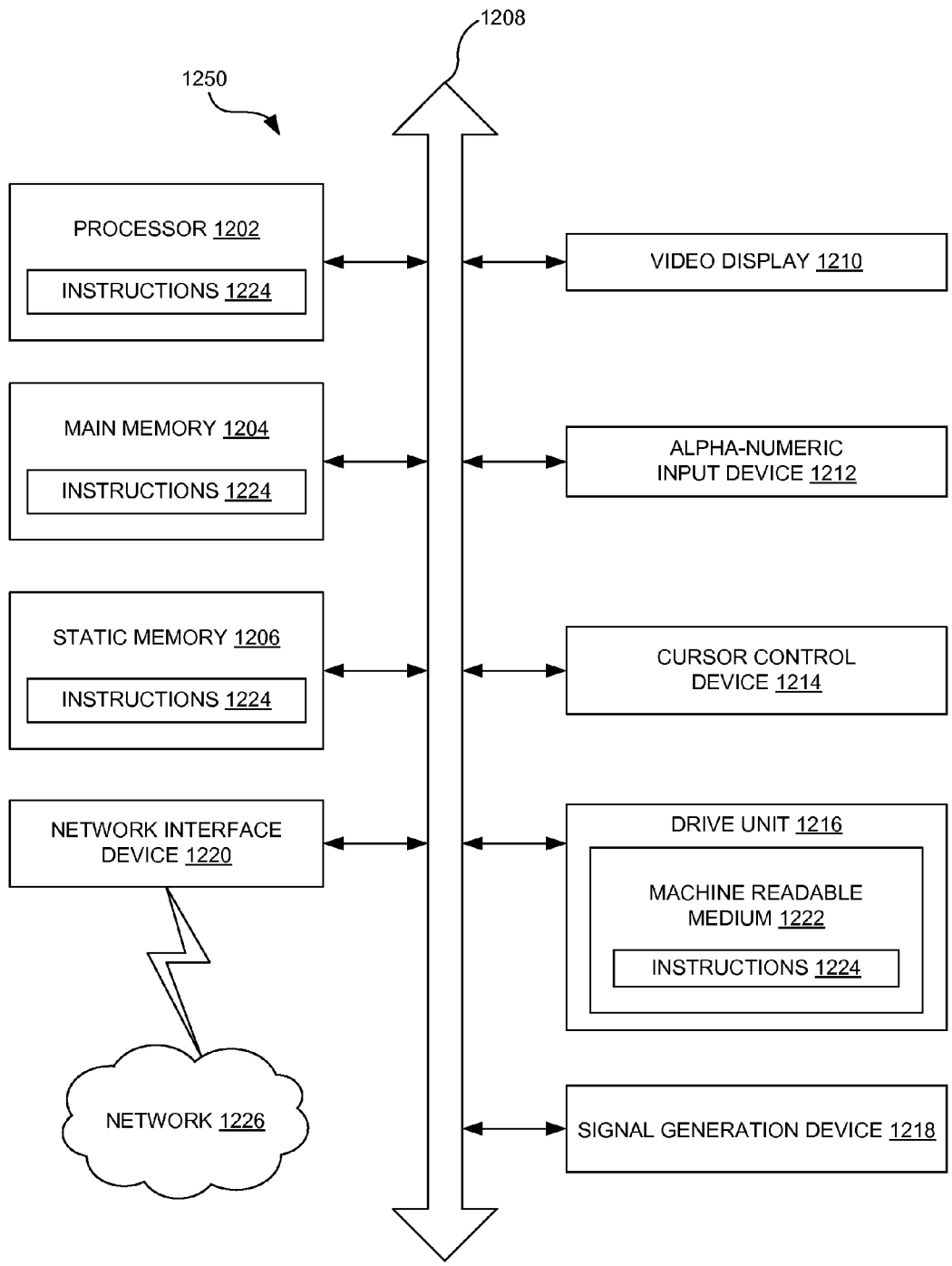
FIG. 12 is a diagrammatic representation of a data processing system capable of performing a set of instructions to perform any one of the methodologies herein, according to one or more embodiments.

FIG. 12 is a diagrammatic representation of a data processing system capable of performing a set of instructions to perform any one of the methodologies herein, according to one or more embodiments. The components as described in the embodiment of FIG. 1, FIG. 2 and FIG. 3 are used herein in reference to FIG. 12 for explanatory purposes. Particularly, the system view 1250 of FIG. 12 illustrates a processor 1202, a main memory 1204, a static memory 1206, a bus 1208, a video display 1210, an alpha-numeric input device 1212, a cursor control device 1214, a drive unit 1216, a signal generation device 1218, a network interface device 1220, a machine readable medium 1222, instructions 1224 and a network 1226, according to one embodiment. In the embodiment of FIG. 12, the data processing system discussed herein may be any of the devices such as the first network element 102, the redundancy removal engine 104, the second network element which are discussed in aforementioned figures.

In the embodiment of FIG. 12, the system view 1250 may indicate a personal computer, a mobile device, a cell phone, a network enabled device and/or a data processing system in which one or more operations disclosed herein may be performed. In this embodiment, the processor 1202 may be a microprocessor, a state machine, an application-specific integrated circuit, a field programmable gate array, etc. In FIG. 12, the main memory 1204 may be a dynamic random access memory and/or a primary memory of a computer system. The static memory 1206 may be a hard drive, a flash drive, and/or other memory information associated with the data processing system, in the embodiment of FIG. 12.

In the embodiment of FIG. 12, the bus 1208 may be an interconnection between various circuits and/or structures of the data processing system. In this embodiment, the video display 1210 may provide graphical representation of information on the data processing system. In the embodiment of FIG. 12, the alpha-numeric input device 1212 may be a keypad, a keyboard and/or any other input device of text. The cursor control device 1214 may be a pointing device such as a mouse, in this embodiment.

In one or more embodiments, such as the embodiment of FIG. 12, the drive unit 1216 may be the hard drive, a storage system, and/or other longer term storage subsystem. In this embodiment, the signal generation device 1218 may be a bios and/or a functional operating system of the data processing system. In some embodiments, the network interface device 1220 may be a device that may perform interface functions such as code conversion, protocol conversion and/or buffering required for communication to and from a network 1226.

In the embodiment of FIG. 12, the machine readable medium 1222 may provide instructions on which any of the methods disclosed herein may be performed. In this embodiment, the instructions 1224 may provide source code and/or data code to the processor 1202 to enable any one or more operations disclosed herein.

Figure 13:
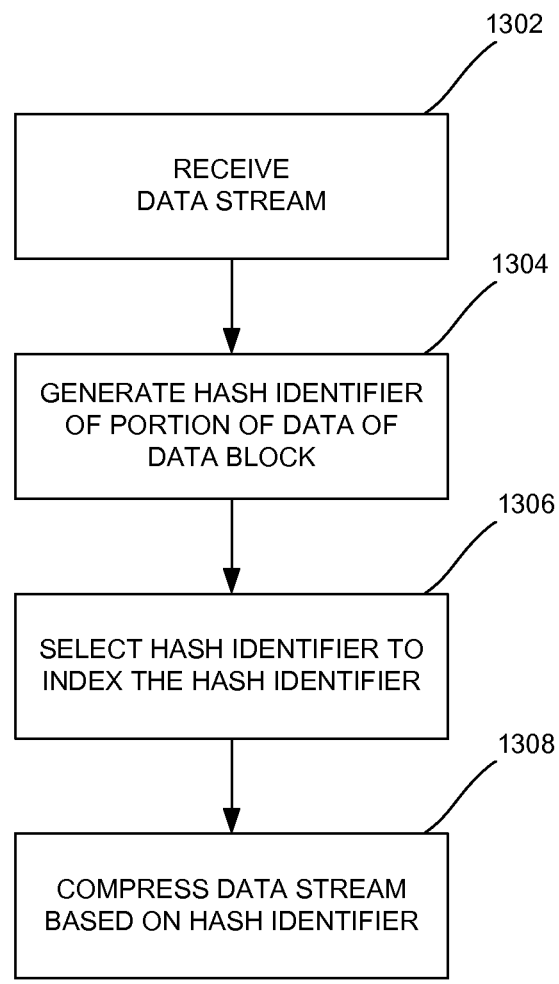
FIG. 13 illustrates a process flow diagram of a method of data de-duplication through a redundancy removal engine of FIG. 1, according to one or more embodiments.

Now refer to FIG. 13. FIG. 13 illustrates a process flow diagram of a method of data de-duplication through a redundancy removal engine of FIG. 1, according to one or more embodiments. In one embodiment, in operation 1302, the transmission control module of the redundancy removal engine associated with the first network element may receive a data stream via a first network connection that communicatively couples the first network element with a source of the data stream. In one embodiment, in operation 1304 a fingerprint module 314 of the redundancy removal engine 104 may generate a hash identifier of at least one portion of data of a contiguous data block stored in a bidirectional cache memory based on an identifier constraint. In one or more embodiments, the size of contiguous data block 602 may be larger than the size of the at least one portion of data of the contiguous data block for which the hash identifier is generated. In one embodiment, each contiguous data block may have a number of hash identifiers. In one embodiment, each pointer identifier that identifies a data block may have a number of hash identifiers associated with the pointer identifier.

In one embodiment, in operation 1306 a transmission control module 302 of the redundancy removal engine 104 may select at least one hash identifier of the number of hash identifiers that is generated through the fingerprint module 314 to index the at least one hash identifier based on a sparsity constraint. In one embodiment, the index may include a mapping of the hash identifier to the portion of data of the data block and/or a concurrent mapping to the pointer identifier of the data block. In one embodiment, in operation 1308, a transmission compression module 304 of the redundancy removal engine 104 may compress the data stream through based on the hash identifier that is indexed. In one embodiment, the data stream that is compressed may be of another TCP connection that is different from the data stream from which the data block was stored. In one embodiment, the data stream based on which the data block was generated may be the data stream that is compressed as well based on the indexed hash identifier.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware, firmware and software (e.g., embodied in a machine readable medium). For example, the various electrical structure and methods may be embodied using transistors, logic gates, and electrical circuits (e.g., application specific integrated (ASIC) circuitry and/or in digital signal processor (DSP) circuitry).

In addition, it will be appreciated that the various operations, processes, and methods disclosed herein may be embodied in a machine-readable medium and/or a machine accessible medium compatible with a data processing system (e.g., a computer devices), may be performed in any order (e.g., including using means for achieving the various operations). Accordingly, the specification and drawings are to be regarded in an illustrative rather than a restrictive sense.

What is claimed is:
1. A method comprising:
receiving a data stream at a transmission control module of a redundancy removal engine associated with a first network element via a first network connection that communicatively couples the first network element with a source of the data stream;

generating through a fingerprint module of the redundancy removal engine associated with the first network element a hash identifier of at least one portion of data of a contiguous data block stored in a bidirectional cache memory of the redundancy removal engine associated with a first network element, the size of contiguous data block is larger than the size of the at least one portion of data of the contiguous data block for which the hash identifier is generated, wherein each contiguous data block to have a plurality of hash identifiers;

selecting through the transmission control module of the redundancy removal engine at least one hash identifier of the plurality of hash identifiers that is generated through the fingerprint module to index the at least one hash identifier associated with the data block based on a sparsity constraint; and compressing the data stream through a transmission compression module of the redundancy removal engine based on the at least one hash identifier that is indexed.

2. The method of claim 1, wherein compressing the data stream through a transmission compression module of the redundancy removal engine based on the hash identifier that is indexed, further comprising:

replacing through a transmission compression module of the redundancy removal engine the portion of data of the data stream that is redundant with a set of commands to compress the data stream based on the at least one hash identifier that is indexed, wherein the set of commands are a set of redundancy instructions.

3. The method of claim 1, further comprising:

storing through a data store module of the redundancy removal engine associated with the first network element the contiguous data block in the bidirectional cache memory of the first network element;

assigning through a mapping module of the redundancy removal engine a pointer identifier to the contiguous data block, the pointer identifier to identify the contiguous data block, wherein the pointer identifier that identifies the contiguous data block is associated with the plurality of hash identifiers that represent the different portions of data of the contiguous data block represented by the pointer identifier for which the hash identifier is generated, and wherein each of the plurality of hash identifiers to represent each of a different portion of data of the contiguous data block for which the hash identifier is generated.

4. The method of claim 1, wherein storing through a data store module of a redundancy removal engine associated with the first network element a contiguous data block in a bidirectional cache memory of the first network element, further comprising:

identifying the contiguous data block of a threshold size associated with the data stream to have a new data;

storing the contiguous data block having new data nearly simultaneously in at least one of the bidirectional cache memory and a persistent storage device of the data store module;

replacing an existing contiguous data block in the bidirectional cache memory with the contiguous data block having new data based on a first in first out policy if the bidirectional cache memory is full when the contiguous data block having new data is identified; and storing the existing contiguous data block that is replaced in the persistent storage device.

5. The method of claim 1, wherein selecting at least one hash identifier of the plurality of hash identifiers that is generated through the fingerprint module based on a sparsity constraint, further comprising:

applying a most significant bit rule of the sparsity constraint to the plurality of hash identifier generated through the fingerprint module to select at least one hash identifier to index where the at least one hash identifier is selected when an equivalent value of a threshold number of the most significant bits of the hash identifier of the portion of data of the contiguous data block is determined to be equal to a predetermined value; and reducing the number of hash identifiers that are indexed based on a distance rule of the sparsity constraint where the hash identifier is indexed if the portion of data of the contiguous data block represented through the hash identifier is spaced at least a threshold data size distant from another portion of data of the contiguous data block represented through another hash identifier that is indexed, wherein the number of hash identifiers that are indexed are reduced to decrease the memory space associated with the first network element consumed through indexing the hash identifiers.

6. The method of claim 1, wherein compressing the data stream based on a hash identifier that is indexed, further comprising:

generating a hash identifier of a portion of data associated with the data stream received at the data store module of the first network element through a first network connection that communicatively couples the first network element with a source of the data stream based on the identifier constraint; and comparing the hash identifier of the portion of the data stream with the indexed hash identifier of the portion of data associated with the contiguous data block stored in the cache to find a match.

7. The method of claim 6, wherein when the hash identifier of the portion of the data stream matches the indexed hash identifier of the portion of data associated with the contiguous data block stored in the bidirectional cache memory the method further comprising:

retrieving through the transmission control module of the redundancy removal engine the contiguous data block stored in the bidirectional cache comprising the portion of data associated with the indexed hash identifier of the portion of data of the data block that matches with the hash identifier of the portion of data associated with the data stream;

comparing the portion of data of the contiguous data block associated with the indexed hash identifier with the portion of data of the data stream associated with the hash identifier that matches the indexed hash identifier to verify a match between the portion of data of the contiguous data block associated with the indexed hash identifier and the portion of data of the data stream associated with the hash identifier that matches the indexed hash identifier based on the match between the indexed hash identifier that represents the portion of data of the contiguous data block stored in the bidirectional cache and the hash identifier that represents the portion of data of the data stream; and maximizing the portion of data of the data stream that is matched with the portion of data of the contiguous data block stored in the bidirectional cache through a per byte bidirectional expansion of the portion of data of the data stream associated with the hash identifier that matches the indexed hash identifier of the portion of data of the contiguous data block stored in the bidirectional cache and nearly simultaneous comparison of the expanded portion of data of the data stream with the data of the contiguous data block stored in the bidirectional cache associated with the indexed hash identifier that matches the hash identifier of the portion of data of the data stream to find a maximal matching portion of data of the data stream associated with the data block represented by the matching indexed hash, wherein the expansion limit is the size of the contiguous data block stored in the bidirectional cache.

8. The method of claim 7, wherein when the maximal matching portion of data of the data stream is found the method further comprising:

replacing the maximal matched portion of data of the data stream with a redundancy instruction comprising an additional information and the pointer identifier that identifies the contiguous data block stored in the bidirectional cache that is associated with the maximal matched portion of data of the data stream to compress the data stream that is transmitted from the first network element, wherein the redundancy instruction to enable a reconstruction of the compressed portion of the data stream, wherein the data size of the redundancy instruction along with the additional information and the indexed hash identifier comprised in the redundancy instruction is smaller than the size of the maximal matched portion of data of the data stream that is replaced with the redundancy instruction.

9. The method of claim 3, further comprising:

appending a threshold number of priority bits to the indexed hash identifier of the portion of data of the contiguous data block stored in the bidirectional cache to manage the indexed hash identifier, the threshold number of priority bits to indicate a priority level of the indexed hash identifier to which the threshold number of priority bits are appended; and evicting the fingerprints with lower priority to effectively reduce the number of indexed hash identifiers of the different portions of data of the contiguous data block stored in the bidirectional cache to manage the index that associates the indexed hash identifier to at least one of the portion of data of the data block and the data block based on which the indexed hash identifier is generated.

10. The method of claim 2, further comprising:

transmitting the compressed data stream comprising the set of redundancy instructions through the transmission control module of the redundancy removal engine of the first network element to a second network element communicatively coupled to the first network element; and receiving through a receiver control module of the redundancy removal engine another compressed data stream comprising another set of redundancy instructions through a second network connection associated with the first network element that communicatively couples the first network element to the second network element from which the compressed data is received.

11. The method of claim 10, further comprising:

reconstructing through a decompression module of the redundancy removal engine a compressed portion of the other data stream that is received based on a redundancy instruction that is used replace a maximal matched portion of the other data stream to compress the other data stream;

replacing through a receiver control module of the redundancy removal engine the compressed portion of the other data stream that is received based on the redundancy instruction with the maximal matched portion of the other data stream via the bidirectional cache memory of the first network element.

12. The method of claim 1:

wherein the identifier constraint based on which at least one of the hash identifier of portion of data of the contiguous data block stored in the bidirectional cache that is indexed and the hash identifier of the portion of data of the data stream is generated is a Rabin Karp hash algorithm, wherein the bidirectional cache to serve the receiver control module, the transmission control module, the decompression module and the transmission compression module of the redundancy removal engine associated with the first network element, and wherein the hash identifier is associated with the pointer identifier that represents the contiguous data block stored in the bidirectional cache memory.

13. A network apparatus, comprising:

a redundancy removal engine configured to compress a data stream received via a first network connection that communicatively couples a first network element to a source of the data stream based on a hash identifier that is indexed associated with a contiguous data block stored in a bidirectional cache memory of the redundancy removal engine; and a fingerprint module of the redundancy removal engine configured to generate a hash identifier of at least one portion of data of the contiguous data block stored in the bidirectional cache memory based on an identifier constraint, the size of the contiguous data block is larger than the size of the at least one portion of data of the contiguous data block for which the hash identifier is generated, wherein each contiguous data block to have a plurality of hash identifiers that represent a plurality of different portions of data of the contiguous data block for which the hash identifier is generated.

14. The network apparatus of claim 13, further comprising:

a transmission control module of the redundancy removal engine to select at least one hash identifier of the plurality of hash identifiers that is generated through the fingerprint module to index the at least one hash identifier based on a sparsity constraint; and a data store module of a redundancy removal engine configured to store a contiguous data block associated with the data stream in at least one of a bidirectional cache memory and persistent storage of the redundancy removal engine based on the indexed hash identifier.

15. The network apparatus of claim 13, further comprising:

a transmission compression module of the redundancy removal engine configured to compress the data stream based on a hash identifier that is indexed through replacing a portion of data of the data stream that includes a redundant data with at least one of a set of redundancy instructions;

a mapping module of the redundancy removal engine configured to assign through the a pointer identifier to the contiguous data block, the pointer identifier to identify the contiguous data block, wherein the pointer identifier that identifies the contiguous data block is associated with the plurality of hash identifiers that represent the different portions of data of the contiguous data block represented by the pointer identifier for which the hash identifier is generated, and wherein each of the plurality of hash identifiers to represent each of a different portion of data of the contiguous data block for which the hash identifier is generated.

16. The network apparatus of claim 13 wherein at least one hash identifier of the plurality of hash identifiers that is generated through the fingerprint module to index the at least one hash identifier is selected through a transmission control module of the redundancy removal engine based on a sparsity constraint.

17. The network apparatus of claim 13:

wherein the data stream is received through the transmission control module at the data store module of the first network element via a first network connection that communicatively couples the first network element with a source of the data stream, wherein the contiguous data block of a threshold size associated with data stream is identifier to have a new data, wherein the contiguous data block having new data is stored nearly simultaneously in at least one of the bidirectional cache memory and a persistent storage device of the data store module, wherein an existing contiguous data block in the bidirectional cache memory is replaced with the contiguous data block having new data based on a first in first out policy if the bidirectional cache memory is full when the contiguous data block having new data is identified, and wherein the existing contiguous data block that is replaced is stored in the persistent storage device.

18. The network apparatus of claim 13:

wherein a most significant bit rule of the sparsity constraint is applied to the plurality of hash identifiers generated through the fingerprint module to select at least one hash identifier to index where the at least one hash identifier is selected when an equivalent value of a threshold number of the most significant bits of the hash identifier of the portion of data of the contiguous data block is determined to be equal to a predetermined value, and wherein the number of hash identifiers that are indexed is reduced based on a distance rule of the sparsity constraint where the hash identifier is indexed if the portion of data of the contiguous data block represented through the hash identifier is spaced at least a threshold data size distant from another portion of data of the contiguous data block represented through another hash identifier that is indexed, wherein the number of hash identifiers that are indexed are reduced to decrease the memory space associated with the first network element consumed through indexing the hash identifiers.

19. The network apparatus of claim 13:

wherein a hash identifier of a portion of data associated with the data stream received at the data store module of the first network element through a first network connection that communicatively couples the first network element with a source of the data stream is generated based on the identifier constraint, and wherein the hash identifier of the portion of the data stream is compared with the indexed hash identifier of the portion of data associated with the contiguous data block stored in the cache to find a match.

20. The network apparatus of claim 19:

wherein the contiguous data block stored in the bidirectional cache comprising the portion of data associated with the indexed hash identifier that matches with the hash identifier of the portion of data associated with the data stream is retrieved through the transmission control module of the redundancy removal engine, wherein the portion of data of the contiguous data block associated is compared with the indexed hash identifier with the portion of data of the data stream associated with the hash identifier that matches the indexed hash identifier to verify a match between the portion of data of the contiguous data block associated with the indexed hash identifier and the portion of data of the data stream associated with the hash identifier that matches the indexed hash identifier based on the match between the indexed hash identifier that represents the portion of data of the contiguous data block stored in the bidirectional cache and the hash identifier that represents the portion of data of the data stream, and wherein the portion of data of the data stream that is matched with the portion of data of the contiguous data block stored in the bidirectional cache is maximized through a per byte bidirectional expansion of the portion of data of the data stream associated with the hash identifier that matches the indexed hash identifier of the portion of data of the contiguous data block stored in the bidirectional cache and simultaneous comparison of the expanded portion of data of the data stream with the data of the contiguous data block stored in the bidirectional cache associated with the indexed hash identifier that matches the hash identifier of the portion of data of the data stream to find a maximal matching portion of data of the data stream, wherein the expansion limit is the size of the contiguous data block stored in the bidirectional cache.

21. The network apparatus of claim 20:

wherein the maximal matched portion of data of the data stream is replaced with a redundancy instruction comprising an additional information and the pointer identifier that identifies the contiguous data block stored in the bidirectional cache that is associated with the maximal matched portion of data of the data stream to compress the data stream that is transmitted from the first network element, wherein the redundancy instruction to enable a reconstruction of the compressed portion of the data stream, and wherein the data size of the redundancy instruction along with the additional information and the indexed hash identifier comprised in the redundancy instruction is smaller than the size of the maximal matched portion of data of the data stream that is replaced with the redundancy instruction.

22. The network apparatus of claim 13, further comprising;

a receiver control module of the redundancy removal engine to receive another compressed data stream comprising another set of redundancy instructions through a second network connection associated with the first network element that communicatively couples the first network element to the second network element from which the compressed data is received.

23. The network apparatus of claim 18:

wherein through the transmission control module of the redundancy removal engine at least two bits of priority data is appended to the indexed hash identifier of the portion of data of the contiguous data block stored in the bidirectional cache to manage the indexed hash identifier, wherein the at least two bits of priority data to indicate a priority level of the indexed hash identifier to which the at least two bits of priority data are appended, and wherein the indexed hash identifier with lower priority is evicted to effectively reduce the number of indexed hash identifiers of the different portions of data of the contiguous data block stored in the bidirectional cache.

24. The network apparatus of claim 22:
wherein through a receiver decompression module of the redundancy removal engine a compressed portion of the other data stream that is received is reconstructed based on a redundancy instruction that is used replace a maximal matched portion of the other data stream to compress the other data stream; and
wherein through a receiver control module of the redundancy removal engine the compressed portion of the other data stream that is received from the second network element is replaced with the maximal matched portion of the other data stream via the bidirectional cache of the first network element based on the redundancy instruction.

25. The network apparatus of claim 13:
wherein the identifier constraint based on which at least one of the hash identifier of portion of data of the contiguous data block stored in the bidirectional cache that is indexed and the hash identifier of the portion of data of the data stream is generated is a Rabin Karp hash algorithm,
wherein the bidirectional cache to serve the receiver control module, the transmission control module, the decompression module and the transmission compression module of the redundancy removal engine associated with the first network element,
wherein the hash identifier is associated with the pointer identifier that represents the contiguous data block stored in the bidirectional cache memory,
wherein through a mapping module of the redundancy removal engine the pointer identifier is assigned to the contiguous data block, and
wherein the pointer identifier to identify the contiguous data block.

26. A network system, comprising:
a source of a data stream;
a first network element comprising a redundancy removal engine to compress a data stream received through a first network connection that communicatively couples the first network element to the source of the data stream based on an indexed hash identifier associated with a contiguous data block stored in a bidirectional cache memory of the redundancy removal engine;
a fingerprint module of the redundancy removal engine configured to generate a hash identifier of at least one portion of data of the contiguous data block stored in the cache memory based on a identifier constraint, the size of contiguous data block is larger than the size of the at least one portion of data of the contiguous data block for which the hash identifier is generated, wherein each contiguous data block to have a plurality of hash identifiers that represent a plurality of different portions of data of the contiguous data block for which the hash identifier is generated; and
a second network element comprising another redundancy removal engine configured to perform at least one of: receiving the compressed data stream transmitted from the first network element, reconstructing the data stream, and forwarding the data stream to a destination network element;
wherein the compressed data stream is in the form of a set of redundancy instructions.

27. The network system of claim 26, wherein the redundancy removal engine of the first network element, further comprising:
a transmission compression module of the redundancy removal engine associated with the first network element configured to compress the data stream based on a hash identifier that is indexed through replacing a portion of data of the data stream that includes a redundant data with at least one of a set of redundancy instructions;
a data store module of a redundancy removal engine associated with the first network element configured to store through associated with the first network element the contiguous data block associated with a data stream in a bidirectional cache memory of the first network element;
a mapping module of the redundancy removal engine associated with the first network element configured to assign through a pointer identifier to the contiguous data block, the pointer identifier to identify the contiguous data block;
a transmission control module of the redundancy removal engine associated with the first network element to select through at least one hash identifier of the plurality of hash identifiers that is generated through the fingerprint module to index the at least one hash identifier based on a sparsity constraint, wherein the transmission control module of the redundancy removal engine of the network apparatus to transmit the compressed data stream to the second network element communicatively coupled to the first network element; and
a receiver control module of the redundancy removal engine associated with the first network element configured to receive another compressed data stream through a second network connection associated with the first network element that communicatively couples the first network element to the second network element from which the compressed data is received.

28. The network system of claim 26:
wherein the pointer identifier that identifies the contiguous data block is associated with the plurality of hash identifiers that represent the different portions of data of the contiguous data block represented by the pointer identifier for which the hash identifier is generated, and
wherein each of the plurality of hash identifiers to represent each of a different portion of data of the contiguous data block for which the hash identifier is generated.

29. The network system of claim 26 wherein at least one hash identifier of the plurality of hash identifiers that is generated through the fingerprint module to index the at least one hash identifier is selected through a transmission control module of the redundancy removal engine based on a sparsity constraint.

30. The network system of claim 26:
wherein the data stream is received through the transmission control module at the data store module of the first network element via a first network connection that communicatively couples the first network element with a source of the data stream,
wherein the contiguous data block of a threshold size associated with data stream is identifier to have a new data,
wherein the contiguous data block having new data is stored nearly simultaneously in at least one of the bidirectional cache memory and a persistent storage device of the data store module,
wherein an existing contiguous data block in the bidirectional cache memory is replaced with the contiguous data block having new data based on a first in first out policy if the bidirectional cache memory is full when the contiguous data block having new data is identified, and wherein the existing contiguous data block that is replaced is stored in the persistent storage device.

31. The network system of claim 26:

wherein a most significant bit rule of the sparsity constraint is applied to the plurality of hash identifiers generated through the fingerprint module to select at least one hash identifier to index where the at least one hash identifier is selected when an equivalent value of a threshold number of the most significant bits of the hash identifier of the portion of data of the contiguous data block is determined to be equal to a predetermined value, and wherein the number of hash identifiers that are indexed is reduced based on a distance rule of the sparsity constraint where the hash identifier is indexed if the portion of data of the contiguous data block represented through the hash identifier is spaced at least a threshold data size distant from another portion of data of the contiguous data block represented through another hash identifier that is indexed, wherein the number of hash identifiers that are indexed are reduced to decrease the memory space associated with the first network element consumed through indexing the hash identifiers.

32. The network system of claim 26:

wherein a hash identifier of a portion of data associated with the data stream received at the data store module of the first network element through a first network connection that communicatively couples the first network element with a source of the data stream is generated based on the identifier constraint, and wherein the hash identifier of the portion of the data stream is compared with the indexed hash identifier of the portion of data associated with the contiguous data block stored in the cache to find a match.

33. The network system of claim 30:

wherein the contiguous data block stored in the bidirectional cache comprising the portion of data associated with the indexed hash identifier that matches with the hash identifier of the portion of data associated with the data stream is retrieved through the transmission control module of the redundancy removal engine, wherein the portion of data of the contiguous data block associated with the indexed hash identifier is compared with the portion of data of the data stream associated with the hash identifier that matches the indexed hash identifier to verify a match between the portion of data of the contiguous data block associated with the indexed hash identifier and the portion of data of the data stream associated with the hash identifier that matches the indexed hash identifier based on the match between the indexed hash identifier that represents the portion of data of the contiguous data block stored in the bidirectional cache and the hash identifier that represents the portion of data of the data stream, and wherein the portion of data of the data stream that is matched with the portion of data of the contiguous data block stored in the bidirectional cache is maximized through a per byte bidirectional expansion of the portion of data of the data stream associated with the hash identifier that matches the indexed hash identifier of the portion of data of the contiguous data block stored in the bidirectional cache and simultaneous comparison of the expanded portion of data of the data stream with the data of the contiguous data block stored in the bidirectional cache associated with the indexed hash identifier that matches the hash identifier of the portion of data of the data stream to find a maximal matching portion of data of the data stream, wherein the expansion limit is the size of the contiguous data block stored in the bidirectional cache.

34. The network system of claim 31:

wherein the maximal matched portion of data of the data stream is replaced with a redundancy instruction comprising an additional information and the pointer identifier that identifies the contiguous data block stored in the bidirectional cache that is associated with the maximal matched portion of data of the data stream to compress the data stream that is transmitted from the first network element, wherein the redundancy instruction to enable a reconstruction of the compressed portion of the data stream, and wherein the data size of the redundancy instruction along with the additional information and the indexed hash identifier comprised in the redundancy instruction is smaller than the size of the maximal matched portion of data of the data stream that is replaced with the redundancy instruction.

35. The network system of claim 29:

wherein through the transmission control module of the redundancy removal engine at least two bits of priority data is appended to the indexed hash identifier of the portion of data of the contiguous data block stored in the bidirectional cache to manage the indexed hash identifier, wherein the at least two bits of priority data to indicate a priority level of the indexed hash identifier to which the at least two bits of priority data are appended, and wherein the indexed hash identifier with lower priority is evicted to effectively reduce the number of indexed hash identifiers of the different portions of data of the contiguous data block stored in the bidirectional cache.

36. The network system of claim 32:

wherein through a decompression module of the redundancy removal engine a compressed portion comprising another set of redundancy instructions of the other data stream that is received is reconstructed based on a redundancy instruction that is used replace a maximal matched portion of the other data stream to compress the other data stream;

wherein through a receiver control module of the redundancy removal engine the compressed portion of the other data stream that is received from the second network element is replaced with the maximal matched portion of the other data stream via the bidirectional cache of the first network element based on the redundancy instruction.

37. The network system of claim 26:

wherein the identifier constraint based on which at least one of the hash identifier of portion of data of the contiguous data block stored in the bidirectional cache that is indexed and the hash identifier of the portion of data of the data stream is generated is a Rabin Karp hash algorithm, wherein the bidirectional cache to serve the receiver control module, the transmission control module, the decompression module and the transmission compression module of the redundancy removal engine associated with the first network element, wherein the hash identifier is associated with the pointer identifier that represents the contiguous data block stored in the bidirectional cache memory, wherein through a mapping module of the redundancy removal engine the pointer identifier is assigned to the contiguous data block, and wherein the pointer identifier to identify the contiguous data block.

* * * * *